(12) United States Patent
Malekizadeh et al.

(10) Patent No.: US 11,866,347 B2
(45) Date of Patent: Jan. 9, 2024

(54) SEPARATOR

(71) Applicant: THE UNIVERSITY OF QUEENSLAND, St Lucia (AU)

(72) Inventors: Ali Malekizadeh, St Lucia (AU); Peer Martin Philipp Schenk, St Lucia (AU)

(73) Assignee: THE UNIVERSITY OF QUEENSLAND, St Lucia (AU)

( * ) Notice: Subject to any disclaimer, the term of this patent is extended or adjusted under 35 U.S.C. 154(b) by 0 days.

(21) Appl. No.: 15/101,256

(22) PCT Filed: Dec. 2, 2014

(86) PCT No.: PCT/AU2014/050389
§ 371 (c)(1),
(2) Date: Jun. 2, 2016

(87) PCT Pub. No.: WO2015/081384
PCT Pub. Date: Jun. 11, 2015

(65) Prior Publication Data
US 2016/0304358 A1 Oct. 20, 2016

(30) Foreign Application Priority Data
Dec. 2, 2013 (AU) ................. 2013904667

(51) Int. Cl.
*C02F 1/28* (2023.01)
*B01D 15/20* (2006.01)
(Continued)

(52) U.S. Cl.
CPC ............ *C02F 1/281* (2013.01); *B01D 15/20* (2013.01); *B01D 24/00* (2013.01); *B01D 37/00* (2013.01);
(Continued)

(58) Field of Classification Search
None
See application file for complete search history.

(56) References Cited

U.S. PATENT DOCUMENTS 3,953,819 A 4/1976 Keerie et al.
4,053,605 A 10/1977 Baldwin
(Continued)

FOREIGN PATENT DOCUMENTS

CL 200100556 8/2002
CN 101507911 A 8/2009
(Continued)

OTHER PUBLICATIONS

Misra, "Aluminum Oxide (Alumina), Hydrated," Kirk-Othmer Encyclopedia of Chemical Technology, vol. 2, Jan. 17, 2003, pp. 421-433, XP055208169, 13 total pages.*
(Continued)

*Primary Examiner* — Jonathan M Peo
(74) *Attorney, Agent, or Firm* — Nixon & Vanderhye P.C.

(57) ABSTRACT

A separator for separating one or more components selected from particulate material, hydrophobic material, non-polar material, microorganisms, or viruses from a mixture of water and the one or more components or from a mixture of a polar liquid and the one or more components, the separator comprising a layer of a metal hydroxide hydrate.

14 Claims, 20 Drawing Sheets

(51) Int. Cl.
*B01D 71/02* (2006.01)
*C02F 1/00* (2023.01)
*B01D 37/00* (2006.01)
*B01D 39/00* (2006.01)
*B01D 24/00* (2006.01)
*B01D 61/14* (2006.01)
*B01D 61/02* (2006.01)

(52) U.S. Cl.
CPC .............. *B01D 39/00* (2013.01); *B01D 71/02* (2013.01); *C02F 1/001* (2013.01); *C02F 1/003* (2013.01); *B01D 61/025* (2013.01); *B01D 61/027* (2013.01); *B01D 61/145* (2013.01); *B01D 61/147* (2013.01); *C02F 2303/04* (2013.01); *Y02W 10/37* (2015.05)

(56) References Cited

U.S. PATENT DOCUMENTS

| | | | |
|---|---|---|---|
| 5,051,189 | A | 9/1991 | Farrah |
| 6,180,016 | B1* | 1/2001 | Johnston ................. C02F 1/288 210/767 |
| 8,007,671 | B2 | 8/2011 | Chen et al. |
| 2005/0098495 | A1 | 5/2005 | Hughes |
| 2006/0157397 | A1* | 7/2006 | Yokota ............... B01D 17/0202 210/266 |
| 2010/0176044 | A1* | 7/2010 | Domb .................... B01J 20/103 210/287 |
| 2013/0153830 | A1 | 6/2013 | Seo et al. |

FOREIGN PATENT DOCUMENTS

| | | |
|---|---|---|
| EP | 0 195 877 A1 | 10/1986 |
| EP | 0 581 510 | 2/1994 |
| JP | 2007-021436 A | 2/2007 |
| JP | 2011-200818 A | 10/2011 |
| JP | 2012-157850 A | 8/2012 |
| WO | WO 2008/129551 | 10/2008 |
| WO | 2010/141825 A2 | 12/2010 |
| WO | WO 2013/051013 | 4/2013 |

OTHER PUBLICATIONS

International Search Report for PCT/AU2014/050389 dated Jan. 19, 2015, 5 pages.
Written Opinion of the ISA for PCT/AU2014/050389 dated Jan. 19, 2015, 4 pages.
Extended European Search Report dated Jul. 10, 2017, issued in European Patent Application No. 14868410.3.
Farrah, Samuel R., et al., "Concentration of Viruses from Water by Using Cellulose Filters Modified by In Situ Precipitation of Ferric and Aluminum Hydroxides," Applied and Environmental Microbiology, Dec. 1985, vol. 50, No. 6, pp. 1502-1504, XP055386628.
Misra, Chanakya, "Aluminum Oxide (Alumina), Hydrated," Kirk-Othmer Encyclopedia of Chemical Technology, vol. 2, Jan. 17, 2003, pp. 421-433, XP055208169.
Farrah, "Concentration of Viruses from Water by Using Cellulose Filters Modified by In Situ Precipitation of Ferric and Aluminum Hydroxides," Applied and Environmental Microbiology, vol. 50, No. 6, 1985, pp. 1502-1504.
Office Action dated Feb. 12, 2019 in European Application No. 14868410.3, 5 pages.
Malekizadeh, Ali, et al., "High flux water purification using aluminium hydroxide hydrate gels", Scientific Reports, vol. 7, Dec. 12, 2017, 13 pages.

* cited by examiner

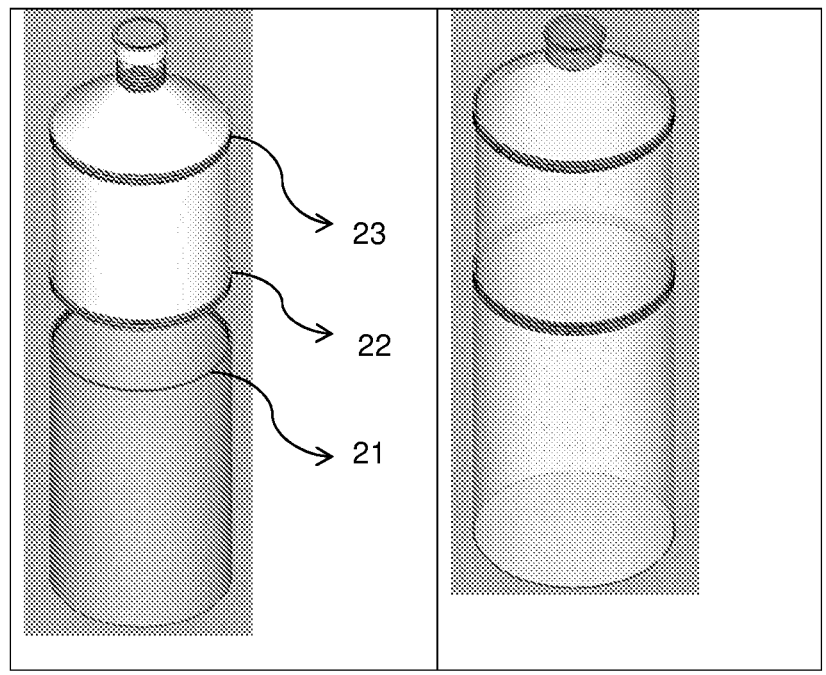
Figure 20                 Figure 21
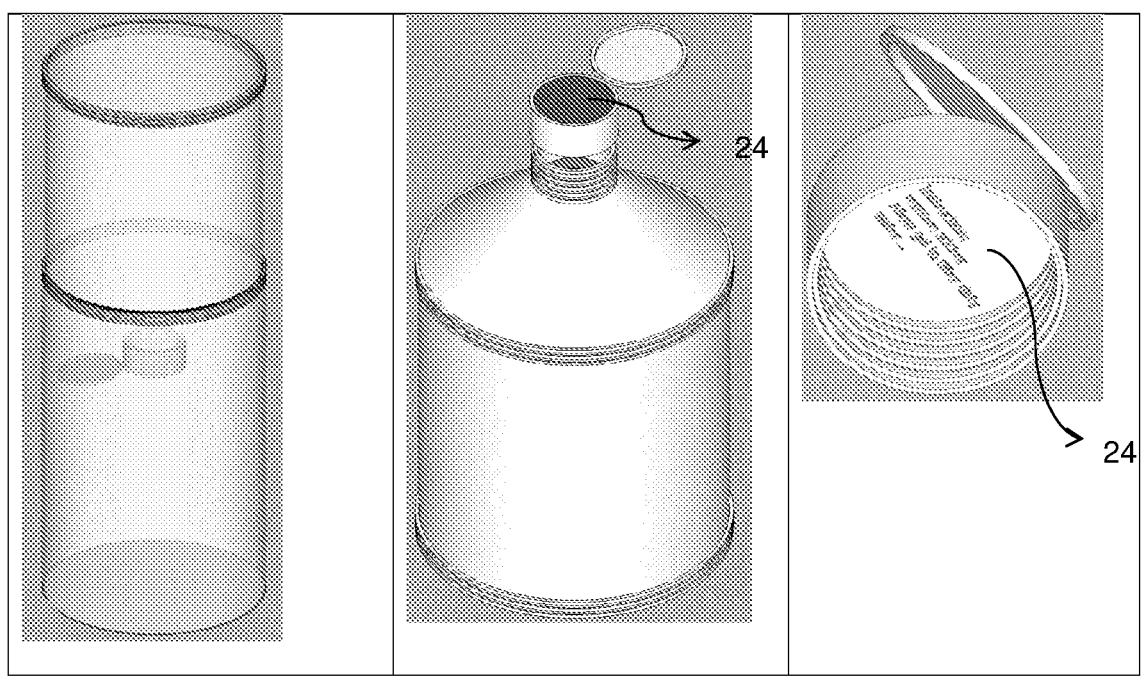
Figure 22                 Figure 23                 Figure 24

SEPARATOR

This application is the U.S. national phase of International Application No. PCT/AU2014/050389 filed 2 Dec. 2014 which designated the U.S. and claims priority to AU Patent Application No. 2013904667 filed 2 Dec. 2013, the entire contents of each of which are hereby incorporated by reference. The publication number for International Application No. PCT/AU2014/050389 is WO2015081384 (published on 11 Jun. 2015).

TECHNICAL FIELD

The present invention relates to a separator. In one aspect, the present invention relates to a separator for separating particulate matter and/or hydrophobic material from water or an aqueous solution or from a water-miscible liquid. In another aspect, the present invention relates to methods for separating particulate matter and/or hydrophobic material from water or an aqueous solution or from a water-miscible liquid.

BACKGROUND ART

Separation of solids, such as particulate material, from water or aqueous solutions, is required in many different industries. A number of different techniques have been developed for separating solids from water. These include filtration, sedimentation, settling, clarification, thickening, cyclonic separation and the like.

Filtration involves passing water, such as a contaminated water, through a filter medium. The filter medium may comprise a bed or cake of fine material, such as sand or diatomaceous earth. Particles in the water that are larger than the interstitial spaces between the particles of filter medium become trapped within the filter medium and are removed from the water. The water passes through the filter medium and is typically recovered. However, particles in the water that are finer than the interstitial spaces between the particles of filter medium can pass through the filter medium and are not removed from the water.

As the filter is continued to be used, the filter medium starts to become filled and blocked by particles retained from the water. A cake of particles will start to form above filter medium and the cake of particles also acts to filter additional particles from the water. The cake of particles above the filter medium increases in thickness as filtering of the water continues.

Eventually, the filter becomes blocked by the particles and it will need to be cleaned. Cleaning typically involves a backwash arrangement in which high pressure water is passed in a reverse direction through the filter medium to remove the retained particles therefrom.

Traditional filters typically allow very fine particles and microorganisms to pass therethrough such that the water that is recovered from the filter still contains very fine particles and microorganisms. In many instances, this results in the water requiring further treatment before it can be used. For example, in the case of drinking water, it is obviously very undesirable to have microorganisms present in the water. Therefore, the filtered water is normally subjected to a chlorination step to kill microorganisms in the water.

In order to remove microorganisms, such as bacteria and viruses, it is also possible to pass the water through nanoporous membranes. Although these nanoporous membranes are very efficient at removing microorganisms, they can be expensive to install and often require large pressure drops to achieve reasonable flow rates therethrough. As a result, nanoporous membranes have not found widespread use in the treatment of drinking water supplies.

Difficulties have also been experienced in separating hydrophobic materials, especially hydrophobic liquids, from water or aqueous solutions. A specific example of difficulties in this regard is demonstrated by difficulties encountered in cleaning spills of crude oil or fuel from shipping tankers. Crude oil and refined fuel spills from tanker ship accidents have caused extensive damage to natural ecosystems in Alaska, the Gulf of Mexico, the Galapagos Islands and many other places. For example, the oil spill caused by an explosion on the Ixtoc I Explorer exploratory rig in the Gulf of Mexico in 1979 resulted in the release of 3 million barrels of oil into the environment. The spill affected 260 km of US beaches. The oil spill caused by an explosion on the Deepwater Horizon II drilling platform in 2010 resulted in a spell of 4.9 million barrels of oil into the Gulf of Mexico. Again, massive environmental damage occurred.

A number of technologies are currently used to try to clean oil spills. These technologies include bioremediation, controlled burning, application of dispersants, skimming and centrifugation. However, each of these techniques suffers from one or more difficulties. Bioremediation takes a long time to take effect and does not remove all oil spills. Burning just reduces the amount of oil and does not work in windy conditions. It also causes air pollution. Dispersants are toxic and will increase toxic hydrocarbon levels and will kill fish eggs. Skimming requires calm water at all times during the process. Centrifugation does not separate all oils and usually some amount of oil remains in the water recovered from centrifugation. United States regulations limit the amount of oil in water that can be returned to the ocean and this has limited the usefulness of centrifugation. Furthermore, the cost of current technologies used to clean oil spills is very high.

Other liquid materials are often desired to be separated into component parts so that high-value component parts can be recovered or so that the volume of component parts to be transported can be reduced, or so than that a longer life product can be formed. For example, milk powder is prepared from milk by evaporation of water from the milk. Separation requires that the milk be heated and this can cause the milk powder to have a cooked flavour due to caramelisation caused by exposure to heat. Many valuable nutrients in milk may also be lost due to heating. Whey can be denatured by heat. High heat (such as the sustained high temperatures above 72° C. associated with pasteurisation) denatures whey proteins. Some vitamins, minerals and beneficial bacteria can also be lost during the heating process. Spray drying and ultrafiltration are being used in dairy industries to create milk powder and to recover milk proteins. However, both processes have high capital and operating costs, due to the need for high pressures.

Other liquid products may also contain high value components. For example the market for health food products is large and expanding rapidly. To give just one example, the global market for carotenoids currently stands at $1.4 billion per annum. Extracting high value products such as beta-carotene from natural sources is very difficult. Costly processes, such as supercritical carbon dioxide extraction, are used for this purpose. These processes are expensive and not amenable to scale up. Other valuable components may also need to be extracted from natural sources or man-made mixtures to provide components for use in the pharmaceutical industry or the cosmetics and beauty industry. Again, these components can be difficult to separate.

The reference to any prior art in this specification is not, and should not be taken as an acknowledgement or any form of suggestion that the prior art forms part of the common general knowledge.

SUMMARY OF INVENTION

The present invention provides a separator and a method for separating components or microorganisms from liquids that is low cost and highly effective.

In a first aspect, the present invention provides a separator for separating one or more components selected from particulate material, hydrophobic material, non-polar material, microorganisms, or viruses from a mixture of water and the one or more components or from a mixture of a polar liquid and the one or more components, the separator comprising a layer of a metal hydroxide hydrate.

In a second aspect, the present invention provides a method for separating one or more components selected from particulate material, hydrophobic material, microorganisms, or viruses from a mixture of water and the one or more components or from a mixture of a polar liquid and the one or more components, the method comprising causing water or polar liquid from the mixture to pass through a layer of metal hydroxide hydrate whilst the one or more components are retained on the layer of metal hydroxide hydrate.

In one embodiment, the metal hydroxide hydrate comprises aluminium hydroxide hydrate. In other embodiments, the metal oxide hydrate may be selected from one or more of hydrates of magnesium hydroxide, zinc hydroxide, manganese hydroxide, cobalt hydroxide and nickel hydroxide.

In some embodiments, the metal hydroxide hydrate is prepared by generating the metal hydroxide in water or in an aqueous solution to thereby form the metal hydroxide hydrate. The present inventors have found that generating the metal hydroxide hydrate in-situ results in very effective separation being achieved.

In some embodiments, the metal hydroxide hydrate is prepared by mixing two or more reactants together to thereby form the metal hydroxide hydrate. In some embodiments, the metal hydroxide hydrate is prepared by mixing two or more reaction solutions together to thereby form the metal hydroxide hydrate.

In other embodiments, the metal hydroxide hydrate is formed by electrolysis.

The separator of the present invention comprises a layer of metal hydroxide hydrate. The layer of metal hydroxide hydrate may be retained by a porous retainer. The porous retainer acts to retain the metal hydroxide hydrate layer whilst also allowing liquid to pass through. The porous retainer may comprise a fabric, a woven material, a foraminous material, a solid material having one or more holes or pores therein, a porous ceramic material or the like. The only requirements for the porous retainer are that (a) it does not react adversely with the metal hydroxide hydrate, (b) it does not react adversely with water or aqueous solutions or the polar liquid from the mixture; and (c) the pores not be so large that the metal hydroxide hydrate can pass therethrough. The porous retainer will suitably be located downstream from the metal hydroxide hydrate layer (throughout this specification, the terms "downstream" and "upstream" are to be determined in accordance with the normal direction of flow of liquid during use).

In one embodiment, the porous retainer may comprise a geotextile fabric.

In some embodiments, the separator may comprise an inlet through which the mixture can enter the separator and an outlet through which the water or polar liquid that has passed through the layer of the hydroxide hydrate can exit the separator.

It will be appreciated that the separator will be structured such that liquid must pass through the layer of metal hydroxide hydrate before it can exit the separator. In this manner, only liquid that has passed through the layer of metal hydroxide hydrate can exit the separator. In this manner, components that cannot pass through the layer of metal hydroxide hydrate cannot leave the separator with the water or polar liquid that has passed through the separator, thereby ensuring separation of the water or polar liquid from the one or more components.

The present inventors have surprisingly discovered that a layer of metal hydroxide hydrate is very effective at separating the one or more components from water or a polar liquid. However, the separator does not separate dissolved materials that are in the water or polar liquid from the water or the polar liquid. It has been found that dissolved materials passed through the separator with the water in the polar liquid. For example, if the mixture comprises a salt solution mixed with the one or more components, the dissolved salt will pass through the separator with the water in which the salt is dissolved.

In some embodiments, the mixture comprises a mixture of an aqueous solution and the one or more components.

In some embodiments, a retainer is placed above or upstream of the layer of metal hydroxide hydrate. The retainer may comprise a fabric, a woven material, a foraminous material, a solid material having one or more holes or pores therein, a porous ceramic material, a mesh material or the like. The retainer upstream of or at the top of the layer of metal hydroxide hydrate may prevent disruption of the layer during addition of the mixture on top of the layer. The retainer at the top may also be used to provide a separate layer separating the retained material from the layer of metal hydroxide hydrate. This may allow for easy removal of the retained components from the layer of metal hydroxide hydrate in circumstances where it is desirable to recover the retained material (for example, if the separator is being used to separate valuable components from the mixture). In other embodiments, the upstream retainer may allow the separator to be backwashed without losing the metal hydroxide hydrate layer during the backwash step. In another embodiment, the metal hydroxide hydrate layer, in being positioned between two retainers, may be flipped or inverted to thereby allow further flow of filtrate therethrough to clean away and accumulated material.

In preferred embodiments of the present invention, the layer of metal hydroxide hydrate is in the form of a layer of metal hydroxide hydrate gel. The metal hydroxide hydrate gel may comprise a thick gel or a thin gel.

The layer of metal hydroxide hydrate may be of any desired thickness. The present inventors have demonstrated that the metal hydroxide hydrate layer may be as thin as 1 micron and still produce good results. The layer of metal hydroxide hydrate may have the thickness of from 1 micron to 1 metre or more, or from 1 micron to 50 cm, or from 1 micron to 30 cm or more, or from 1 micron to 10 cm, or from 1 micron to 5 cm, or from 1 micron to 10 mm, or from 1 micron to 5 mm, or from 1 micron to 1 mm. The present inventors have found that the flow rate of filtrate through the layer of metal hydroxide hydrate increases as the thickness of the layer of metal hydroxide hydrate decreases. The layer of metal hydroxide hydrate may have a minimum thickness of 1 micron, or 5 microns, or 10 microns, or 50 microns, or 100 microns, or 250 microns, or 500 microns or 1 mm.

Desirably, the layer of metal hydroxide hydrate comprises a continuous layer of metal hydroxide hydrate. Providing such a continuous layer means that short-circuiting, bypassing or channelling through the metal hydroxide hydrate layer is likely to be avoided, thereby ensuring that all filtrate has passed through the metal hydroxide hydrate layer.

Without wishing to be bound by theory, the present inventors believe that the mode of operation of the separator of the present invention is quite different to operation of a filter. Metal hydroxide hydrates and particularly metal hydroxide hydrate gels comprise atoms of metal hydroxide having a number of water molecules trapped between a net of the hydroxide molecules. However, it is believed that the water molecules are not strongly bonded to the hydroxide molecules. Water molecules are very small with a very low molecular weight of 18 g/mol and a very small molecular diameter of about 2.75 Å.

FIG. 1 shows a hypothetical model of the molecular structure of an aluminium hydroxide hydrate. The fact that when the hydrate is dried it transforms to a hard crystallised shape instead of the metal hydroxide powder further supports this hypothesis. The molecules of aluminium hydroxide are shown at reference numeral "a". Water molecules ("b" and "c" in FIG. 1) are attracted to the positive and negative charges of the aluminium hydroxide molecules. Therefore, the water molecules are not strongly bonded to the aluminium hydroxide molecules and can easily and naturally leave the aluminium hydroxide hydrate. Therefore, the present inventors believe that water can easily pass through a layer of aluminium hydroxide hydrate without any need for vacuum or pressure, whilst other sub-micron and, nano- or pico-sized contaminants (such as algae, bacteria, fungi, viruses, spores and other small single or multicellular organisms and particulate material) cannot pass through the layer of aluminium hydroxide hydrate. Gravity and/or pressure applied to the liquid mixture assist in driving water through the liquid mixture. The electric charges of the aluminium hydroxide molecules are also believed to be another driving force. The electric charges of the aluminium hydroxide molecules attract water molecules close to the top surface of the layer of the aluminium hydroxide hydrate. As the water molecules move into the hydrate layer, water molecules at the bottom of the layer are forced to leave by gravity and/or pressure by the above water column and/or subpressure at the bottom of the layer and can be recovered. This cycle continues until nearly no water molecules remain on top of the layer of metal hydroxide hydrate. The layer of metal hydroxide hydrate only allows water molecules and other polar molecules to pass through the layer. All insoluble solid particles are captured by the layer, if they are in the nanometre or picometre range (or larger). Polar liquid molecules or polar molecules that dissolve in water, such as salt, sugar and chlorophyll, also pass through the metal hydroxide hydrate layer. However, all non-polar liquid hydrocarbons which are not soluble in water (such as oils, kerosene and hexane) and other hydrophobic compounds (even if partially soluble in water; such as beta-carotene) cannot pass the hydrate layer and therefore will be retained on top of the layer of metal hydroxide hydrate.

In some embodiments, the number of water molecules associated with each molecule of metal hydroxide in the hydrate may vary, because over time, water may naturally separate from the hydrate or water may enter the hydrate. For example, dilute fresh aluminium hydroxide hydrate that has been manufactured from the electrolysis of salty water contains almost approximately 300 molecules of water for each molecule of aluminium hydroxide. However, the hydrate layer will be compressed when it is being used to separate water from mixtures and the hydrate layer may be converted to a creamy gel-like material, which occurs because the number of water molecules for each molecule of aluminium hydroxide will be decreased. It is also believed that the conditions used to perform the metal hydroxide hydrate may affect the number of water molecules associated with each molecule of metal hydroxide.

In some embodiments, the metal hydroxide hydrate may be in the form of a gel. The gel may have an appearance similar to a thin cream, such as a thin face cream. When spread out over a surface (e.g. rubbed between fingers) the gel feels wet, similar to a thin cream, but then the water rapidly evaporates leaving only the metal hydroxide behind.

In some embodiments, the metal hydroxide hydrate may have at least 10 molecules of water associated with each molecule of metal hydroxide. Preferably, the metal hydroxide hydrate may have at least 16 molecules of water associated with each molecule of metal hydroxide, more preferably at least 20 molecules of water associated with each molecule of metal hydroxide, even more preferably at least 30 molecules of water so say with each molecule of hydroxide, even more preferably from 30 to 400 molecules of water associated with each molecule of metal hydroxide, even more preferably from 37 to 300 molecules of water associated with each molecule of metal hydroxide, or from 37 to 90 molecules of water associated with each molecule of metal hydroxide.

Further features of embodiments of the present invention will be described with reference to the following drawings and examples.

Any of the features described herein can be combined in any combination with any one or more of the other features described herein within the scope of the invention.

BRIEF DESCRIPTION OF DRAWINGS

FIG. 20 shows a view of separate bottle parts that can be used to make a device suitable for generating sanitised water for use in emergency situations;

FIG. 21 shows the bottle parts of FIG. 20 connected together for normal use;

FIG. 22 shows the bottle of FIG. 21 in which the top and bottom portions have been unscrewed, the top portion inverted and then connected to the bottom portion to enable water to be filtered and a clean filtrate to be collected in the bottom portion of the bottle;

FIG. 23 shows a more detailed view of the top of the bottle shown in FIG. 20 with the cap removed;

FIG. 24 shows details of a cap having a metal hydroxide hydrate gel sealed underneath a removable seal;

EXAMPLES

Figure 1:
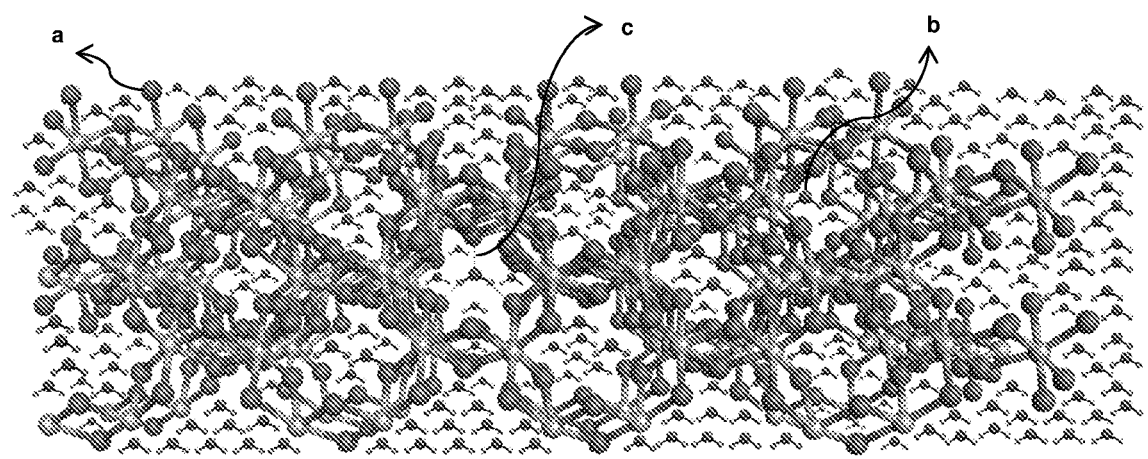
FIG. 1 shows a hypothetical model of the molecular structure of an aluminium hydroxide hydrate.

In the following examples, the metal hydroxide hydrate was produced in-situ by generating the metal hydroxide in water or in an aqueous solution. The metal hydroxide hydrate was in the form of a gel. In the following examples, the terms "hydrate gel", "gel" and similar terms are used interchangeably with the term "metal hydroxide hydrate". All uses of these terms in the following description of the samples shall be taken to be a reference to the layer of metal hydroxide hydrate that is used to separate components from the mixture. Similarly, the terms "filtration", "hydrate filtration system", "gel system", "gel filtration" and "gel filtration system" (and similar terms such as "filter" and "separation") are used to refer to having or causing water or polar liquids or aqueous solutions passing through the layer of metal hydroxide hydrate whilst other components, such as particulate material, algae, bacteria, fungi, viruses, non-polar or hydrophobic liquids and solids are retained by the layer of metal hydroxide hydrate.

Example 1

Preparation of Aluminium Hydroxide Hydrate

Aluminium hydroxide is an inorganic, non-toxic compound that is insoluble in water with a molecular weight of 78. Over 100 million tons of aluminium hydroxide is produced each year and over 90% of that is converted to aluminium oxide for use in the manufacture of aluminium metal (the bulk of that aluminium hydroxide that is calcined to form aluminium oxide and subsequently converted to aluminium metal is made using the Bayer process). Aluminium hydroxide is used as a feedstock for the manufacture of other aluminium compounds, such as calcined alumina, aluminium sulphate, polyaluminium chloride, aluminium chloride, zeolites, sodium aluminate, activated alumina and aluminium nitrate.

Aluminium hydroxide can be made by the electrolysis of saline water (having a salinity normally in the range of from 30 to 70 parts per thousand, PPT) using aluminium electrodes and DC current. A DC current from 3 to 12V (preferably 9V) and 1 Amp current can be used. It will be appreciated that a wide range of conditions can be used.

Aluminium hydroxide can also be produced by mixing aluminium sulphate (a salt that is used to reduce soil pH in gardening and also as an antacid for heart burn) and sodium bicarbonate (baking soda) solutions. Both aluminium sulphate and sodium bicarbonate are very low cost and remarkably non-toxic chemicals. The following reaction will occur:

$$Al_2(SO_4)_3 + 6NaHCO_3 \rightarrow 3Na_2SO_4 + 2Al(OH)_3 + 6CO_2 \quad (1)$$

As the aluminium hydroxide is formed in an aqueous solution, aluminium hydroxide hydrate will quickly form. Depending on the molarity (concentration) of the aluminium sulphate solution and sodium bicarbonate solution used to form the aluminium hydroxide, hydrates of different formulas, concentration and thicknesses can be made for different applications. For example, at 20° C., the solubility of aluminium sulphate and sodium bicarbonate in 100 mL of water are 36.4 g and 1.6 g, respectively. Therefore, at 20° C., to make a stoichiometric mixture for use in equation (1) and using saturated solutions, 36.4 g of aluminium sulphate is mixed in 100 mL of water and 53.76 g of sodium bicarbonate is mixed in 560 mL of water. Adding the aluminium sulphate solution to the sodium bicarbonate solution will result in a stoichiometric reaction mixture being formed and no excess of aluminium sulphate or sodium bicarbonate will remain in the solution at the end of the reaction.

It is also possible to make a thicker or denser aluminium hydroxide hydrate by mixing the reactants in water at high temperatures. For example, at 100° C., the solubility of aluminium sulphate and sodium bicarbonate in 100 mL of water increases to 89 g and 23.6 g, respectively. Therefore, at 100° C., to make a stoichiometric mixture for use in equation (1), 89 g of ammonium sulphate are mixed in with 100 mL of hot water and 130.98 g of sodium bicarbonate are mixed in 555 mL of hot water (the hot water is at near 100° C.). If these solutions are mixed, a thicker aluminium hydroxide hydrate is formed. This aluminium hydroxide hydrate is more compressed and has less water molecules for each molecule of aluminium hydroxide compared to a hydrate made at 20° C. The ratio of aluminium hydroxide to water molecules is higher and therefore the electric charges of aluminium hydroxide on each water molecule is higher and retention of water molecules is stronger than in the aluminium hydroxide hydrate which is made at 20° C. It may also be possible to mix the ingredients in a pressurised heated reactor to increase the solubility of the ingredients to make a very dense and highly charged metal hydroxide hydrate.

Experiments conducted by the present inventors have made aluminium hydroxide by mixing solutions of aluminium sulphate solutions of sodium bicarbonate at 20° C. and 100° C. The aluminium hydroxide hydrate produced at 20° C. (room temperature) has a formula of approximately $Al(OH)_3 \times 90\ H_2O$ (i.e. about 90 molecules of water for each molecule of aluminium hydroxide). The aluminium hydroxide hydrate produced at 100° C. has a formula of approximately $Al(OH)_3 \times 37\ H_2O$ (i.e. about 37 molecules of water for each molecule of aluminium hydroxide). In this experiment, the number of water molecules and aluminium hydroxide molecules of the different hydrate formulas was determined by weighing different samples before and after freeze-drying. The aluminium hydroxide hydrate looks like a very light hydrating cream and is similar to cold kheer in its physical state. When it is touched, it feels like touching water.

In the following examples, the terms "normal hydrate" or "normal gel" are used to refer to a hydrate that is formed at 20° C. The terms "thicker hydrate" or "thicker gel" are used to refer to a hydrate that is formed at near 100° C.

Example 2

Water Purification

One in six people in the world do not have access to clean water. 3.4 million people die each year from water-related diseases, mostly in developing countries. Current common water purification technologies include coagulation and flocculation, followed by dissolved air flotation and sand filtration, chlorine disinfection and sludge thickening. These conventional technologies produce high quality drinking water but are expensive in both capital costs and operating costs. Development of cheaper and simpler water treatment processes to produce potable drinking water is desirable.

An aluminium hydroxide hydrate was prepared using solutions of aluminium sulphate and sodium bicarbonate. The aluminium hydroxide hydrate was retained on a porous geotextile fabric. A glass housing having an open top and an open bottom was positioned such that the geotextile fabric extended across the open bottom. In this manner, the layer of aluminium hydroxide hydrate was located at the bottom of the glass housing. A collection beaker was positioned underneath the geotextile fabric to collect any liquid that passed through the layer of aluminium hydroxide hydrate.

Water was taken from the Brisbane River. Brisbane River water is very turbid and contains significant amounts of suspended solids and colloidal solids. A sample of Brisbane River water was poured into the glass housing and water passed through the layer of aluminium hydroxide hydrate. This water was collected in the collection beaker. The collected water will be referred to as a "filtrate". The filtrate had a measured optical density (at 450 nm) of 0.000, which is the same as distilled water. This means that effectively nearly all suspended solids and fine particles have been trapped on top of the layer of aluminium hydroxide hydrate. The geotextile fabric that was used to support the layer of aluminium hydroxide hydrate had a 90 micron pore size (polypropylene 260 gsm nonwoven geotextile) and this is a very inexpensive geotextile fabric. However, other media or fabrics can also be used, based upon the specific application design flow rates and the required strength of the retaining media, to support the hydrate layer.

Example 3

Bacteria and Fungi Tests on Filtrate

Several bacterial and fungi growth tests were performed on filtrate water recovered from treating Brisbane River water in accordance with the method described in Example 2. These tests showed that all bacteria and fungi in the Brisbane River water were captured by the layer of aluminium hydroxide hydrate. To assess the possibility of using this process for large-scale drinking water purification, pipe tests were also performed on Brisbane river water.

To assess how this separation system captures bacteria and fungi, several LB bacteria and PDA fungi tests were performed using different hydrate formulas. Lennox LB is a highly referenced microbial growth medium used for *E. coli* and bacterial cultivation. This nutrient-rich microbial broth contains peptides, amino acids, water-soluble vitamins, and carbohydrates in a low-salt formulation. The addition of agar provides a solid medium for microbial growth. LB medium was made by mixing 10 g tryptone, 5 g yeast extract, 15 g Agar, 10 g NaCl in 950 mL of deionized water. The solution was autoclaved for 20 mins at 15 psi, 121° C. and after being cooled to 55° C. was poured in petridishes, and stored in a cold dark room at +4° C. To measure fungi growth in the filtrate, Potato Dextrose Agar (PDA) medium was used. PDA is the most widely used medium for cultivation of fungi. PDA medium was prepared by adding 4 g of potato extract (200 g of infusion from potato), 20 g of Dextrose and 15 g of Agar to 1 L of purified water. The solution was autoclaved at 121° C. and after being cooled to 55° C. was poured into petridishes and stored in a cold dark room at +4° C.

Figure 2:
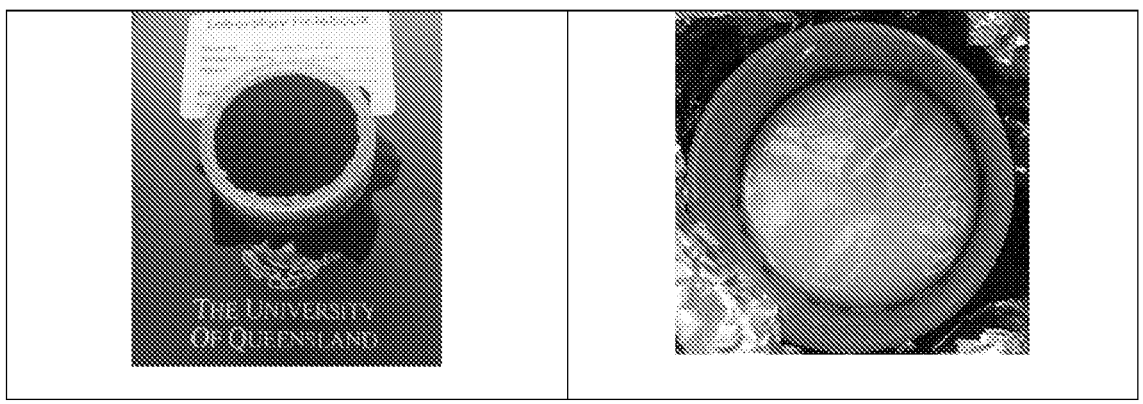
FIG. 2 shows a photograph of the separation system used in example 2.

Aluminium hydroxide hydrate was made by electrolysis of saline water with a concentration of 70 PPT (70 g NaCl solved in 1 L of distilled water) using aluminium electrodes (or at least an aluminium anode). A DC current of 9 V and 1 amp was used during electrolysis. Aluminium hydroxide hydrate was also prepared by mixing saturated solutions of aluminium sulphate and sodium bicarbonate made at room temperature (20° C.). 36.4 g of aluminium sulphate was mixed in 100 mL of distilled water and 53.76 g of sodium bicarbonate was mixed in 560 mL of distilled water. Aluminium sulphate solution was added gradually to the sodium bicarbonate solution. The mixed solutions were left for about 2 hours to allow all $CO_2$ molecules to separate. The reaction-based gel solution was added on top of a geotextile fabric and washed with distilled water to remove any unreacted aluminium sulphate. The same amount of 20 mL of electrolysis-based aluminium hydroxide hydrate and reaction-based aluminium hydroxide hydrate was used for each experiment. The simple filtration equipment used for tests is shown in FIG. 2. A 90 micron nonwoven geotextile was fixed at the bottom of a round plastic container with a diameter of 76 mm.

Turbid Brisbane river water was collected from the Brisbane River close to the University of Queensland. All filtration equipment was autoclaved and cooled before the tests. To avoid cross contamination, all tests were performed under laminar flow. A layer of aluminium hydroxide hydrate was added on top of the geotextile fabric and Brisbane River water was added on top of the hydrate gel. The first 50 mL of the filtrate was not collected to allow for removal of water molecules that were already present in the hydrate. The same volume (100 microliters) of Brisbane river water before filtration and after filtration was added to each LB and PDA plates. LB plates were put in an incubator for 24 hours and PDA plates wrapped by aluminium foil and left in a room for one week.

Figure 3:
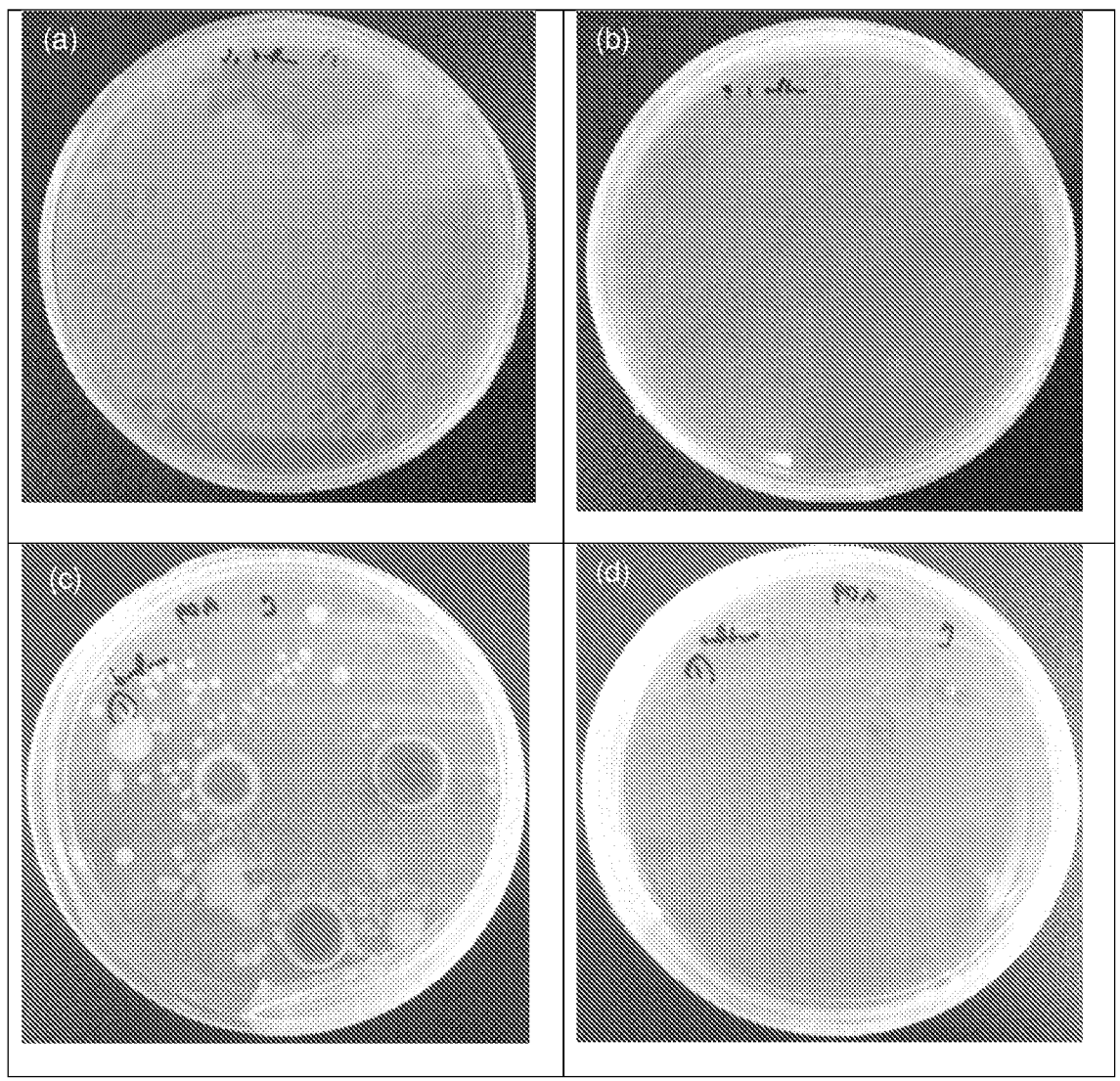
FIG. 3 shows photographs of bacterial and fungal growth tests, with FIG. 3a showing bacterial growth tests conducted on Brisbane River water, FIG. 3b showing bacterial growth tests conducted on filtrate recovered from Brisbane River water that has passed through a layer of aluminium hydroxide hydrate, FIG. 3c showing fungal growth tests conducted on Brisbane River water and FIG. 3d showing fungal growth tests conducted on filtrate recovered from Brisbane River water that has passed through a layer of aluminium hydroxide hydrate.

All test results showed no bacterial and fungal growth from the filtrate water. Therefore, the filtrate was completely sanitised by the layer of aluminium hydroxide hydrate. FIG. 3 shows LB bacteria and PDA fungi tests results on Brisbane river water before and after filtration by aluminium hydroxide hydrate made by electrolysis. After 24 hours, growth from hundreds of bacterial colonies was observed from water before filtration (FIG. 3*a*) but no bacterial colony growth came from the filtrate (FIG. 3*b*). Similar results were observed on PDA fungi test plates after one week. Some fungal growth came from the Brisbane River water before filtration (FIG. 3*c*), but no fungal growth came from the filtrate (FIG. 3*d*) and all fungi were also trapped by this system. Therefore, all suspended solids and bacteria and fungi in the Brisbane River water were captured and no bacterial colonies or fungal growth were observed in all tests after aluminium hydroxide hydrate filtration. Therefore, the water was considered completely sterilised by passing through the homogenous layer of aluminium hydroxide hydrate.

Similar tests were conducted by passing Brisbane River water through a layer of aluminium hydroxide hydrate made by reaction between solutions of aluminium sulphate and sodium bicarbonate. Similar results were obtained with no signs of bacterial or fungal growth observed on media when applying the filtrate water onto petridishes.

Supernatant Brisbane River water was removed from above the layer of aluminium hydroxide hydrate and tested for bacteria which formed colonies on LB plates. This demonstrates that the aluminium hydroxide hydrate did not kill the bacteria. Rather, as no bacteria were detected in the filtrate, the aluminium hydroxide hydrate layer prevents passage of bacteria through that layer.

These tests show that all bacteria and fungi are captured by the layer of aluminium hydroxide hydrate. The water that has passed through that layer is effectively sterilised. Thus, passing the Brisbane River water through the layer of aluminium hydroxide hydrate not only separates all suspended solids in the water but also captures all microorganisms. The filtrate is clear water. Further treatment (such as chlorination) should not be required.

Comparative Example

Several LB and PDA tests were performed on Brisbane River water filtered through filter media made by rapidly mixing aluminium hydroxide powder and water at high temperature. A gel was not formed. Unlike the case where the aluminium hydroxide hydrate layer was formed in-situ by electrolysis or reaction, the water was not sterilised and there were still some culturable bacteria in the filtrate.

Example 4

Effect of the Pressure of the Column of Water in Hydrate Gel Filtration (Large-Scale Calculations (Pipe Test))

One scaled PVC pipe with a transparent pipe installed parallel to measure the height of the column of water was used for this experiment. The pipe had a height of 150 cm and a cross section area of 0.00567 $m^2$ (56.7 cm). 90 micron Polypropylene 260 gsm nonwoven geotextile was used as a supporting filter medium for the hydrate layer. Time was recorded for every 10 cm decrease in height of the column of water. Optical density (OD) of the filtrate was also measured over time. Several different tests were carried out with different formulas and different thicknesses of hydrate layer and different heights and different river water turbidities.

Figure 4:
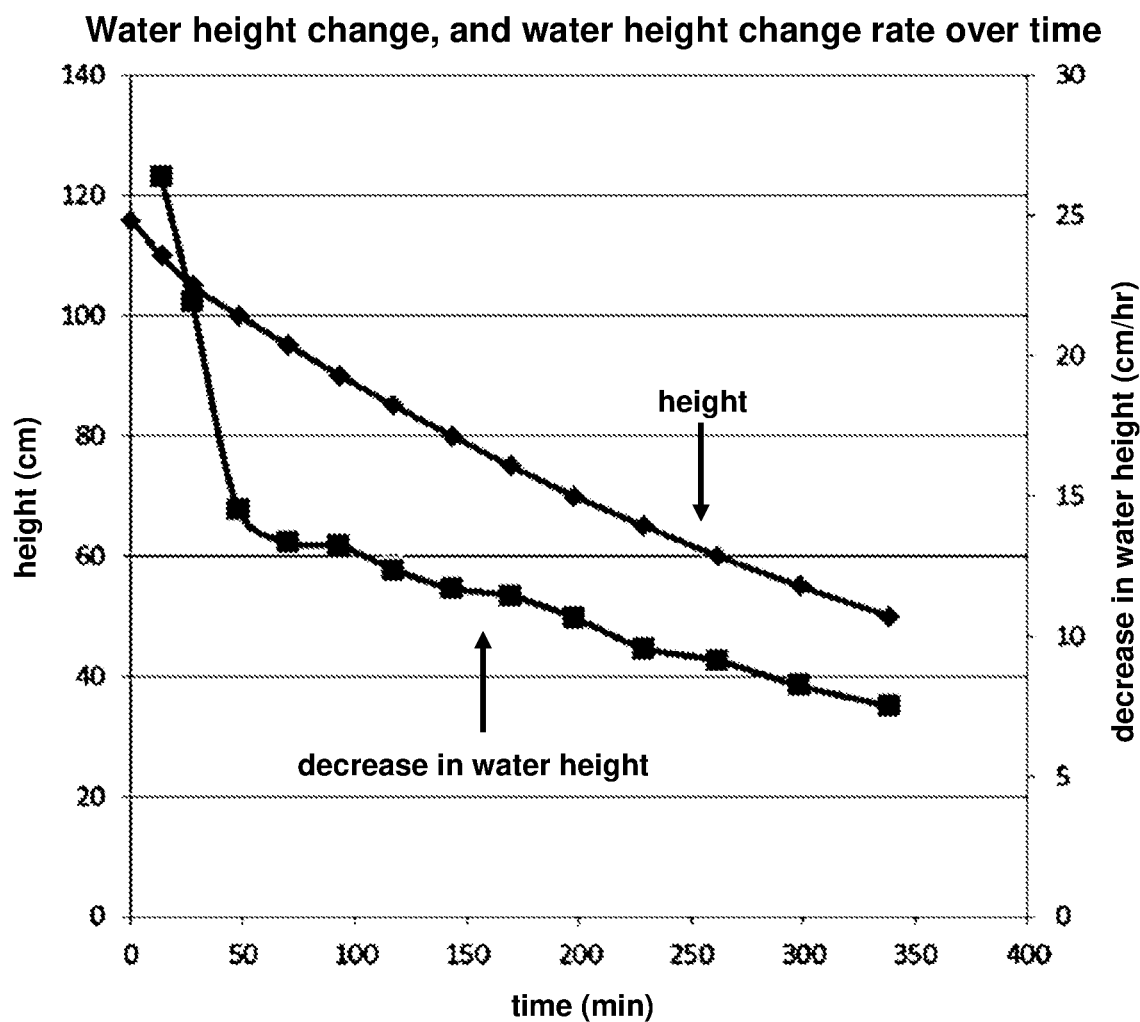
FIG. 4 shows a plot of water height change and water height change rate against time for the experiment set out in Example 4.

200 mL of hydrate gel (both electrolysis- and reaction-based) which had been stored for more than 6 months (to prove it will not degrade over time) was used for this experiment. Water height change and water height change rate over time are shown in FIG. 4. Flow rate and flux of each section was also calculated. These data can be used for scale-up calculations. The Brisbane river water samples were used for tests at different turbidity. River water OD ranged from less turbid water (OD 450 nm 0.120) to high turbid (OD 450 nm 0.550). Regardless of the turbidity of river water and the height of the column of water, the filtrate water was always clear with the OD at 450 nm of 0.000. The successful results also prove that the gel will not degrade over a long period of time and it works as long as it is in water in a wet, and not dried, condition.

Figure 5:
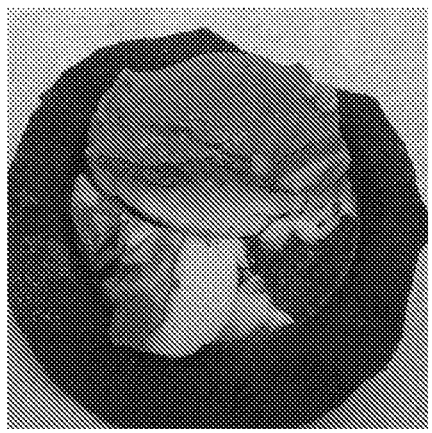
FIG. 5 is a photograph showing the layer of aluminium hydroxide hydrate gel and the layer of separated solids on top of the gel following filtration of Brisbane River water through the gel.

After using the gel layer to filter 10 samples, although the flow rate decreased a little due to the accumulation of suspended solids on the gel, no blinding occurred and the separation system still worked. All suspended solids, such as tiny soil or wood particles and silts, were collected and compressed on top of the gel and made a thick brown paste (see FIG. 5). In FIG. 5, the white layer comprises the layer of aluminium hydroxide hydrate gel and the brown layer on top comprises the suspended solids and particulate material that has been removed from the river water. Water treatment plants have sludge thickening units for dewatering of the sludge for ease of transportation. This thick dewatered sludge also proves that using this process, no sludge thickening unit may be needed for future large-scale water treatment plants based on the present invention. Commercial water treatment plants may utilise a thick metal hydroxide layer, for example, 1 metre thick, or even thicker. This layer may be cleaned by scooping or scraping the built-up material off the top of the layer. Thick layers of metal hydroxide hydrate may also be used in other applications.

FIG. 4 shows that even with a thick (5 cm depth) hydrate gel layer, the filtrate flow rate is reasonably fast. As the height of the column of water increases, the pressure and filtrate flow rate increases. Over time the flow rate decreases because of the decrease in column height and the reduced pressure resulting from the head of water. The average column height decreased per hour was 13 cm. About 3136 $L/(d \cdot m^2)$ of river water can be purified using this technology without any energy input. Therefore, this technology can be used easily as a one-step water purification and disinfection process for various application sizes. This technology can be implemented for small-scale water treatment in rural and remote areas. This technology can also be used for large-scale municipal water treatment. This technology can simplify conventional overly complicated and expensive water treatment processes into a simple single step process. A simple sedimentation tank or similar compartments (such as a funnel-like tower with less surface area for the ease of operation, and less gel consumption) can be used instead of current complex water treatment plants.

A variety of different shapes that vary from a simple bucket to more complicated filter equipment using vacuum or rotary drum filters may be used for water purification using hydrate filtration in accordance with the present invention. For example, one simple bucket may solve the safe drinking water problem of a large family in developing countries. Hydrate gel may be kept between two types of fabrics or filter media. A bottom small pore size fabric retains the gel and a top higher pore size fabric (to avoid clogging and blinding) retains suspended solids and contaminants and prevents breakage of the gel layer during filling. A ring which is cut from another similar bucket may keep the top fabric fitted in the system.

Figure 6:
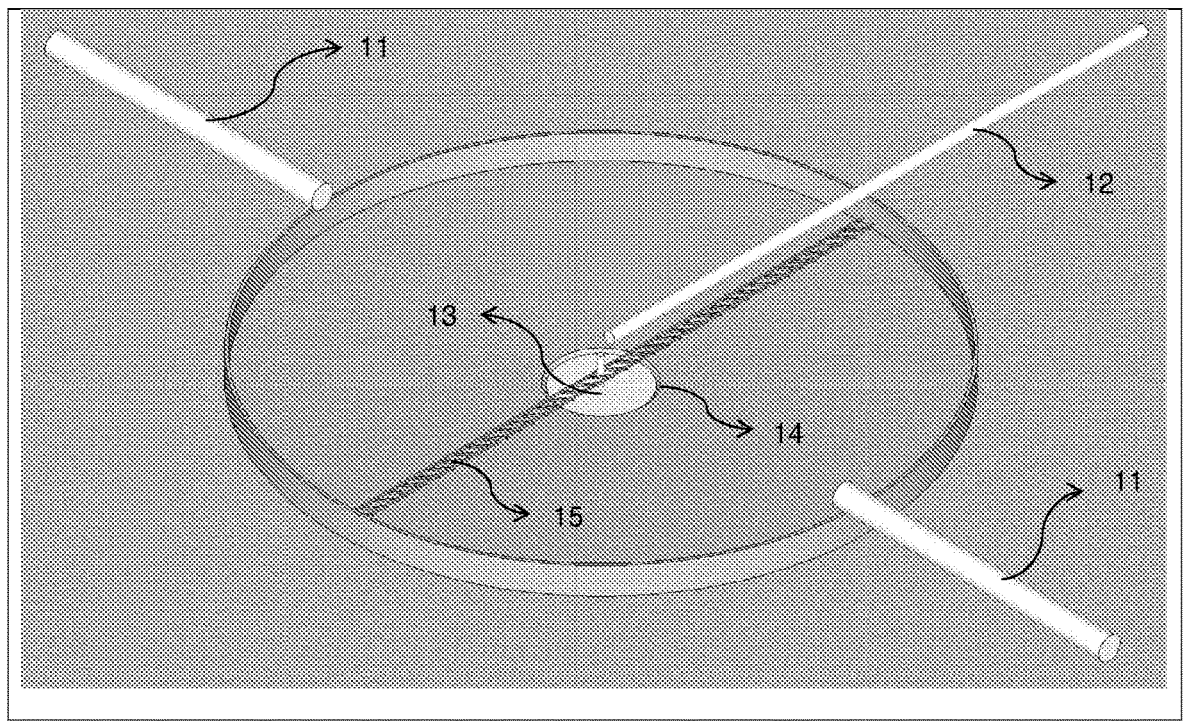
FIG. 6 shows a perspective view of a possible design of a water treatment plant incorporating separation technology in accordance with an embodiment of the present invention.
Figure 7:
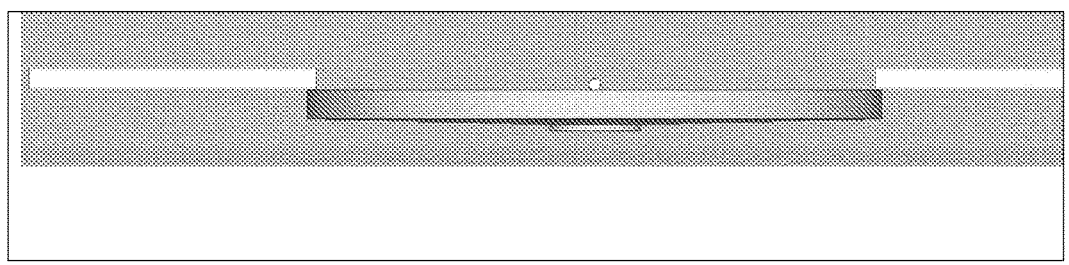
FIG. 7 shows a side view of the water treatment plant shown in FIG. 6.

Using this technology, it is possible to simplify several water treatment stages into one stage. A simple conceptual design similar to conventional sedimentation clarifiers of water treatment plants is shown in FIG. 6. As the water height increases the flow rate also increases and therefore less surface area of the hydrate gel needed. It is possible to put a sedimentation tank separately before the hydrate gel filtration unit to separate soil particles, silts and similar solid particles that naturally settle. However, it is also possible to encapsulate all stages in one stage as shown in FIG. 6. The middle section 13 is the hydrate gel filtration section. The water treatment may happen either continuously or in daily batch cycles. First, the hydrate gel is pumped into the middle section using a pipe 12. Then the water is pumped using pipes 11. Some solids settle over time. Due to the slope of this sedimentation clarifier or using conventional squeegees 15 (that collect settled sludge in circular movements) settleable solids are removed through a sludge pipe 14. A similar squeegee system can collect the suspended solids that accumulate on top of the hydrate filtration section. A side elevation of the water treatment plant of FIG. 6 is shown in FIG. 7.

Different sizes of this simple water purification system with different batch, semi continuous or continuous systems can be built based on hydrate filtration technology. Different settled solids removal systems (e.g. continuous or periodical squeegee or manual or putting a fabric or similar media on top of the gel) can also be designed. Different sizes of water treatment plants from hundreds of thousands of litres to millions of litres can also be designed. For example, for natural (no suction and/or pressure) daily filtration of about 314 million litres (which may be enough for daily consumption of a city), a sedimentation tank, 200 m diameter with a height of 10 m, can be designed. It can also be used in combination with conventional water treatment systems. It can be added as final stage for sanitation and clarification to remove any remaining traces of suspended solids and bacteria, viruses and pathogens in water. Because some pathogens are chlorine resistant, the final product of disinfection using this technology may be safer for drinking compared to chlorine-disinfected water.

Example 5

Capturing Viruses by Hydrate Filtration

Half of the hospital beds occupied in the world are caused by the lack of safe drinking water. Unsafe water is the reason for 88% of the global cases of diarrhoea and 90% of the deaths are caused by diarrheal diseases in children under five years old. Viruses are a major cause of human water-borne and water-related diseases. Water-borne diseases are caused by water that is contaminated by human and animal urine and faeces that contain pathogenic microorganisms. People can get infected through contact with or consumption of the contaminated water.

For surface water (water from lakes, rivers, or reservoirs) treatment, coagulation, flocculation and sedimentation and conventional filtration processes mainly remove dirts, larger particles and suspended solids. That is why the last step of chlorine disinfection is used. However, many water-borne pathogens are resistant to chlorine and are regularly found in purified water of conventional water treatment plants. These chlorine-resistant pathogens include a variety of viruses, parasites and bacteria that can cause hepatitis, gastroenteritis, cryptosporidiosis and Legionnaires disease. Therefore, there is an essential need to find a more efficient and less problematic water disinfection process. Hydrate gel filtration that only allows water molecules to pass, is a new potential process to remove pathogens from water.

To see if the hydrate gel can capture viruses, bacteriophage was added to water and Polymerase Chain Reaction (PCR) tests performed to amplify any virus in the filtrate to see if any traces of virus occurred in the filtrate.

3 μL of M13K07 Helper Phage virus (from NEB Biolabs) were added to 20 mL of distilled water and mixed and added to the top of a thicker hydrate gel (made at 100° C.). Based on M13K07 DNA sequence, forward and reverse primers were designed.

Phusion PCR was used for these tests. A master mix was made by mixing 7.2 µL of water, 4 µL of 5*HF Buffer, 1.6 µL of dNTPs, 2 µL of forward, 2 µL of reverse primers, and 0.2 µL of Phusion polymerase enzyme (Thermo Scientific). 3 µL of each sample was added to the master mix and was poured into PCR tubes and placed in a PCR machine. The Phusion PCR program was 98° C. for 30 s, followed by 35 cycles (98° C. for 10 s, 65° C. for 30 s, and 72° C. for 30 s) and 72° C. for 10 mins, and 16° C. for an extended time.

Figure 8:
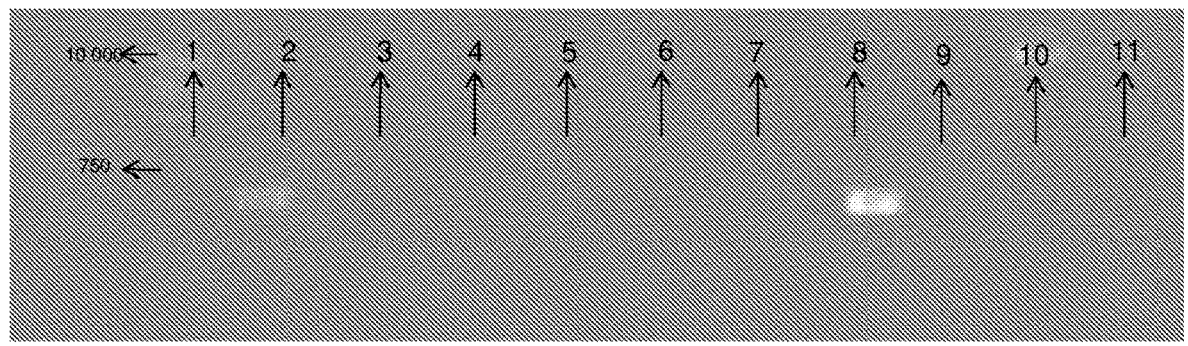
FIG. 8 shows PCR results obtained from example 5.

After PCR, gel electrophoresis was used for size separation and analysis of DNA. Thick (2% w/v) agarose gel containing ethidium bromide was used for this experiment. 4 µL of loading was dye added to each PCR tube. 5 µL of wide range DNA ladder and 10 µL of each sample were added to the agarose gel wells. The gel was subjected to agarose gel electrophoresis and ran at 100 V for 15 min. After electrophoresis, the gel was placed on an ultraviolet light for DNA visualisation. FIG. 8 shows the results.

Figure 11:
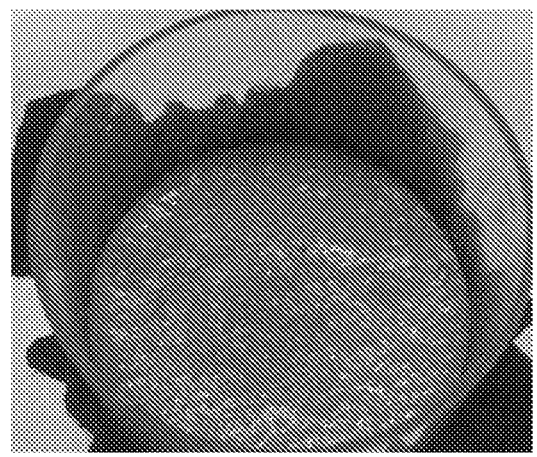
FIG. 11 shows separation of beta-carotene and solids from carrot juice using hydrate filtration in accordance with an embodiment of the present invention.

PCR results (FIG. 8) show no traces of virus DNA in the filtrate, while the controls show that phage DNA was readily amplified. FIG. 8.1 shows the wide-range DNA ladder. FIG. 8.2, FIG. 8.9, FIG. 11 show amplified phage DNA in controls (no filtration). Other columns (FIG. 8.3, 8.4, 8.5, 8.6, 8.7, 8.8, 8.10) contained different filtrate samples that show no traces of phage DNA amplifications. FIG. 8.2 is a filtration liquid control (3 µL of phage solution+20 mL of water). It was kept on ice during the time of filtration and was not used for filtration. FIG. 8.9 is the same control that was kept at room temperature (25° C.) during filtration. FIG. 8.11 is another higher concentration phage control made by adding 3 µL of phage solution to Phusion PCR master mix (17 µL).

These results demonstrate that the homogenous hydrate gel can capture viruses. Therefore, hydrate filtration not only captures bacteria, fungi and larger microorganisms, but also small viruses of approx. 10 nm (such as bacteriophages) are captured using this technology. Therefore, pathogens can be captured resulting in filtrate water that is completely sanitised and safer to drink compared to conventional water treatment systems. Therefore, this technology can be used as a new one-step water treatment system that removes all suspended solids and pathogenic microorganisms. This process can be used instead of conventional problematic and toxic chlorine disinfection.

Example 6

Oil Spills (Release of Crude Oil from Tankers to Environment)

Crude oil and refined fuel spills from tanker ship accidents have damaged natural ecosystems in Alaska, the Gulf of Mexico, the Galapagos Islands, France and many other places. For example, just one oil spill incident (Ixtoc I) released 3 million barrels of oil into environment and affected 260 km of US beaches. It has caused long-term irreparable negative effects on the environment.

Current technologies to solve this problem, such as bioremediation, controlled burning, dispersants, skimming, and centrifugation are not effective. Furthermore, the cost of current technologies is very high. For example, $100 million was spent to clean up just one accident, the Ixtoc I oil spill, in 1979.

The cost of hydrate filtration technology in accordance with the present invention is very low compared to conventional technologies for cleaning oil spills. It can be implemented on different ships and treated water can be directly pumped back to the ocean while oil separated from the water can be collected in storage tanks. Specific ships for this system can also be designed. Hydrate filters can break oil-water emulsions, so it will remove oil spills. Therefore, unlike centrifugation processes, the filtrate water obtained using the technology of the present invention can be pumped back to the ocean. This technology also recovers the oil, which is a major advantage compared to other conventional solutions such as bioremediation, burning and dispersants. Based on the increasing amount of oil usage and spills, the potential market size of this technology is significant. It also has other indirect tangible and intangible benefits of protecting the environment, saving precious coastal areas and protecting tourism industries and fishery and food industries. Furthermore, thousands of chemical, petrochemical and oil refineries around the world and boat harbours can use this technology to manage their oil spill problems.

A thicker hydrate gel, made by mixing stoichiometry saturated solutions of aluminium sulphate and sodium bicarbonate at 100° C., was used for this experiment. 30 mL of this hydrate gel was added to the top of a porous geotextile fabric and placed in a vessel having an open top and an open bottom. 50 mL of Shell Helix HX3 20-50 motor oil was vigorously mixed with water (50% oil+50% water) to form a partial oil in water emulsion. The resulting oil-water mixture was added on top of the hydrate gel and allowed to be filtered.

The hydrate gel filter separated the oil in water emulsion and a separate oil phase was retained on top of the gel. The filtrate was clear water with no sign of oil droplets. Even after 24 hours from the end of the process, no oil droplet passed the hydrate filter, and all oil was retained on top of the gel. The results also demonstrate the hydrate filtration theory, where only water molecules or small polar molecules can pass and other nonpolar non-aqueous liquids such as oils and hydrocarbons cannot pass the hydrate filter. Therefore, this technology can be used for solving oily water and oil spill problems in many industries. For example, this can also be used in oil refineries and chemical and petrochemical plants to separate oil from water or to separate polar oils from nonpolar oils. Similar results were observed using normal hydrate gel (made at 20° C.) and when using other oil in water emulsions (e.g. to defatten milk or to separate lipid bodies from oleaginous microalgae; examples 9 and 12).

Example 7

Separation Based on Polarity

Hydrate gel filters in accordance with the present invention do not let non-polar liquids that are not water-soluble pass. Therefore, because most liquid hydrocarbons are nonpolar and insoluble in water, they can be captured by hydrate filtration. One application for this technology is to remove water from jet fuel (which is kerosene). Removing all water from jet fuel is impractical using current technologies. Water in jet fuel is a critical problem and there have been several accidents, such as the crash of British Airways Flight 38, that have occurred because water in the jet fuel froze. The separation system of the present invention can remove the last drops of water from jet fuel. Using this technology, numerous other liquids can be separated from water based on their relative polarity.

Figure 9:
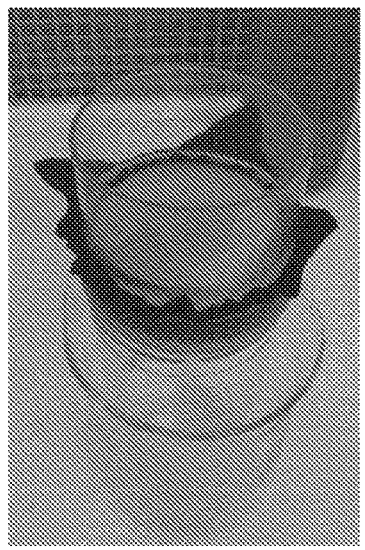
FIG. 9 shows a photograph taken at the end of the experimental run of example 7.

A thicker hydrate gel made by mixing stoichiometric saturated solutions of aluminium sulphate and sodium bicarbonate was used for this experiment (made at 100° C.). 30 mL of this thicker gel was added to the top of the filtration equipment. The hydrate gel was supported on geotextile fabric. 100 mL of a mixture of kerosene (containing blue pigments) and water (50% kerosene and 50% water that had been vigorously mixed) was added to the top of the hydrate gel filter. At the end of the experiment clear water was collected at the bottom without any sign of kerosene, while all kerosene was captured on top of the hydrate gel. Even after 24 hours no kerosene passed the hydrate gel. FIG. 9 shows a photograph taken at the end of the experimental run. In FIG. 9, clear water can be seen at the bottom and a blue layer of kerosene can be seen as being retained on top of the layer of hydrate gel.

Example 8

Passage of Polar Liquids

To prove that polar water-soluble liquids pass the hydrate gel, other experiments were conducted using non-aqueous polar liquids. Although Chlorophyll is a compound that has hydrophobic tail region it also has a polar hydrophilic head group and is water soluble. 100 mL of Chlorophyll a was added on top of 50 mL of thicker hydrate gel (made at near 100° C.). The same filtration equipment used for previous experiments was used for this test. Chlorophyll molecules passed the hydrate gel as expected.

Hexane is a non-polar colourless hydrocarbon liquid; therefore it should not pass the hydrate filter. Hexane was mixed with water and added to the top of the hydrate gel. Because hexane evaporates very fast under a fume hood, the top section of the filtration equipment was sealed with aluminium foil, masking tape and Parafilm. Similar to the kerosene experiment, water molecules passed through the hydrate filter but hexane molecules could not pass the hydrate and were retained on the hydrate layer. The filtration equipment was left for a long period of time under the fume hood, but even after one week no drop of hexane passed the hydrate filter. Similar results were observed using normal aluminium hydroxide hydrate gel (made at 20° C.).

These experiments also demonstrate the new theory of hydrate filtration that is the basis of this invention. Therefore, it is possible to separate different hydrocarbons and chemicals based on their relative polarity and their molecular charges. Non-polar components which are insoluble in water such as hydrocarbons and kerosene cannot pass the hydrate filter but polar water-soluble components such as chlorophyll will pass the filter. This may open up the possibility to build new chemical refineries and chemical plants based on these properties of the hydrate filter using different chemicals as liquid hydrates and different formulas and thicknesses of hydrates.

The fact that kerosene and hexane did not pass the hydrate gel filter even after a longer period demonstrates that this technology can also be used for water/hydrocarbon separation units, or hydrocarbon storages. Specific hydrocarbons storages can be designed and the hydrate gel can be placed at the bottom of the storage. All water should be removed from the bottom of the storage tank.

Example 9

Diary and Milk Processing Industries (Making Milk Powder and Whey Protein as by Product)

Most people regularly consume milk, cheese and other dairy products. Over 20 million metric tons of cheese is produced each year. Many people also use whey protein around the world. The whey protein market is growing fast, where between 2005-2008, the market value increased by up to 24% to $3.8 billion. The present invention has the potential to be used widely in dairy industries. It can be used for concentration of milk before making cheese and making whey protein as a by-product.

Milk powder made by current evaporation and heat drying, such as drum drying, has a cooked flavour due to caramelisation caused by heat exposure. Many valuable nutrients in milk may also be lost due to heating. Whey can also be denatured by heat. High heat (such as the sustained high temperatures above 72° C. associated with the pasteurisation process) denatures whey proteins. For example, due to heating during pasteurisation, some vitamins, minerals, and beneficial (or probiotic) bacteria can be lost (thiamine and vitamin B12 is reduced by 10% and vitamin C by 20%). Conventional milk powder manufacturers use evaporators followed by spray drying into a heat chamber. Milk is applied as a thin film to the surface of a heated drum, and dried milk solids are then scraped off. This process causes an undesirable cooked flavour and many nutrients in milk may be lost. Ultrafiltration is a new technology used in dairy industries, but very high capital and operating costs associated with this expensive technology hinders widespread usage of this technology. It has also very high operating costs due to a need for high pressures. However, using hydrate filtration in accordance with embodiments of the present invention just needs very simple equipment and there is no need for high pressure and energy input. It may only need very low or medium pressures. The natural pressure of the column of liquid may be sufficient to produce these low or medium pressures. Cheese made by traditional cheese making processes has lower quality compared to cheese made using ultrafiltration processes. Freeze-drying preserves perishable materials for milk powder. However, this process is very expensive for large-scale applications due to high electricity usage for freezing and vacuum processes and very high equipment and maintenance costs.

The product of milk treated using hydrate filtration in accordance with embodiments of the present invention is a very thick creamy paste that can be easily dried using a simple natural air-drying with unheated forced air or solar drying. Therefore, the milk powder produced by hydrate filtration does not have an unpleasant cooked flavour like conventional milk powders that are currently available in the market. The dairy products made by this process and ultrafiltration have better health quality than conventional processes because they keep heat-sensitive components in the product. Ultrafiltration technology makes high quality products similar to hydrate filtration. However, ultrafiltration technology is very expensive and cannot be implemented in small factories and remote farms, whilst a simple hydrate filtration system in accordance with the present invention can be implemented at very low cost anywhere without the need for expensive equipment.

In this experiment, a thicker hydrate gel made by mixing stoichiometric saturated solutions of aluminium sulphate and sodium bicarbonate was used (made at near 100° C.). 30 mL of this thick gel was added to the top of the filtration equipment. 150 mL of semi skimmed milk was filtered through a hydrate filter in accordance with the present invention.

Figure 10:
FIG. 10 shows a photograph taken at the end of the filtration process in which milk is passed through a layer of aluminium hydroxide hydrate.

FIG. 10 shows a photograph taken at the end of the filtration process. Filtrate water is more clear compared to milk before filtration. Concentrated milk solids and fats are captured on top of the hydrate gel. Similar results are observed using normal hydrate gel (made at 20° C.).

Hydrate gel filtration of milk proves that the hydrate gel can break oil in water emulsions and separate oil from milk. It gives similar results to ultrafiltration of milk without any need for very high equipment and process costs. The concentrated paste of milk solids and fats captured on top of the hydrate gel can be easily converted to milk powder using conventional unheated drying processes such as forced air fan drying. This will result in new higher quality milk powders that unlike current milk powders in the market, have no unpleasant cooked flavour due to caramelisation caused by heat exposure during the heated drum drying process.

Because whey proteins are water soluble and therefore pass through the hydrate filter, the filtrate has whey proteins. By drying the filtrate (using conventional drying processes such as spray drying) whey protein powder will produced. This can be sold as a valuable by-product.

Example 10

Extracting Natural High Value Products and Pigments Such as Beta-Carotene

The present invention offers a new low cost process for separation of high value products from natural sources based on their polarity and solubility in water. The health food products market is large and growing quickly. For example, the global market for carotenoids is $1.4 billion per annum. Extracting high value products such as beta-carotene from natural sources is very difficult. Different new pharmaceutical products, such as drugs and health and beauty products, can be made using the technology of the present invention. The cosmetics industry is also a large business and currently generates an estimated annual turnover of US$170 billion. A variety of different new cosmetics products such as skin-care creams, lotions, powders, perfumes, lipsticks and make-up blushes from natural sources can be made from ingredients obtained using the technology of the present invention. Compared to petroleum-based cosmetics products, these products are believed to have better health and nutritional skin care effects.

In this example a thicker hydrate gel made by mixing stoichiometry saturated solutions of aluminium sulphate and sodium bicarbonate was used (made at near 100° C.). 30 mL of this thick gel added on top of the same filtration equipment was used as for previous tests. 100 mL of carrot, pomegranate, tomato and mint juices were added on top of the gels and allowed to be filtered.

FIG. 11 shows separation of beta-carotene-containing solids from carrot juice using hydrate filtration. Orange pigments of beta-carotene are captured on top of the hydrate gel. Beta-carotene is a non-polar molecule and therefore cannot pass the hydrate filter. Conventional separation technologies such as centrifugation cannot separate beta-carotene molecules from carrot juice; high temperature evaporation of carrot juice denatures beta-carotene molecules and produces a gum-like material.

Figure 12:
FIG. 12 shows separation of pomegranate juice pigments using hydrate filtration in accordance with an embodiment of the present invention.
Figure 13:
FIG. 13 shows lycopene red pigments of tomato juice separated from water using hydrate filtration technology in accordance with an embodiment of the present invention.

Hydrate filtration also separates pomegranate juice pigments (FIG. 12). Lycopene is another valuable bright red carotenoid pigment found in tomatoes and other red fruits and vegetables such as red carrot, red bell peppers, water melon, gac and papayas (but not strawberries). Lycopene molecules are non-polar and therefore cannot pass the hydrate filter and will collect on top of hydrate gel after filtration. Lycopene red pigments of tomato juice are also easily separated from water using hydrate filtration technology (see FIG. 13). Lycopene has been shown to be also good for skin health, UV protection, skin cancer prevention and acts as an anti-aging and anti-wrinkle agent. Lycopene tablets are expensive (about US$50 for 30 tablets). After separation of lycopene by filtration of different lycopene-rich juices, such as tomato or watermelon, a variety of different cosmetic products such as anti-aging or anti-wrinkling creams, soaps, shower gels and shampoos, or toothpastes can be manufactured. Health hazards are a concern for many conventional make-up and cosmetic products. Using hydrate filtration, a variety of natural ingredient makeup products such as blushes and lipsticks can be made. These high value make-up products can be specifically made for luxury markets. Concentrated tomato juice can also be air dried and sold as lycopene tablets.

Figure 14:
FIG. 14 shows mint juice extracted and filtered by hydrate filtration using hydrate filtration technology in accordance with an embodiment of the present invention, with menthol and pigments collected on top of the gel.

Menthol is another insoluble organic compound which can be extracted using this technology. Menthol demand exceeds supply and has a large market including chewing gum and candy products. Mint juice was extracted and filtered by hydrate filtration. Menthol and other pigments collected on top of the gel (FIG. 14). Similar results were observed using normal hydrate gel (made at 20° C.).

A number of other products were also tested. In one experiment, capsaicin was separated from red chilli pepper juice. The red peppers crushed and the red juice separated and filtered in accordance with the present invention. 50 mL of the red pepper juice was added on top of hydrate gel and allowed to be filtered. This resulted in the separation of capsaicin-containing solids from red pepper juice. The filtrate was clear without any signs of red pigments. No red pigment could penetrate into the depth of hydrate and everything is concentrated on top of the hydrate layer.

Watermelon juice was separated using a hydrate filter. 50 mL of watermelon juice was added on top of a hydrate gel and allowed to be filtered. This resulted in the separation of lycopene-containing solids from the watermelon juice. Similarly the filtrate was clear without any signs of red pigments. No red pigment could penetrate into the depth of hydrate and everything is concentrated on top of hydrate the layer.

Apricot is another carotenoid rich fruit. Apricot juice was separated/concentrated using a hydrate filter. 50 mL of apricot juice was added on top of gel and allowed to be filtered This resulted in the separation of beta-carotene-containing solids from apricot juice. Similarly the filtrate was clear without any signs of yellow pigments. No yellow pigment could penetrate into the depth of hydrate and everything is concentrated on top of hydrate the layer.

*Papaya* is another beta-carotene and lycopene rich fruit. *Papaya* juice was concentrated/separated using a hydrate filter. 50 mL of *papaya* juice was added on top of gel and allowed to be filtered. This resulted in the separation of beta-carotene-lycopene-containing gelatinous solids from *papaya* juice. Similarly the filtrate was clear without any signs of pigments. No pigment could penetrate into the depth of hydrate and everything is concentrated on top of the hydrate layer.

Mango is another beta-carotene rich fruit. Mango juice was concentrated/separated using a hydrate filter. 50 mL of mango juice was added on top of gel and allowed to be filtered. This resulted in the separation of beta-carotene-containing solids from mango juice. Similarly the filtrate was clear without any signs of yellow pigments. No yellow pigment could penetrate into the depth of hydrate and everything is concentrated on top of the hydrate layer.

Rockmelon is another beta-carotene rich fruit. Rockmelon juice was separated/concentrated using a hydrate filter. 50 mL of rockmelon juice was added on top of gel and allowed to be filtered. This resulted in the separation of beta-carotene-containing solids from rockmelon juice. Similarly the filtrate was clear without any signs of yellow pigments. No yellow pigment could penetrate into the depth of hydrate and everything is concentrated on top of the hydrate layer.

Passionfruit juice was concentrated/separated using a hydrate filter. 50 mL of passionfruit juice was added on top of gel and allowed to be filtered. This resulted in the separation of beta-carotene-containing solids from passionfruit juice. Similarly the filtrate was clear without any signs of yellow pigments. No yellow pigment could penetrate into the depth of hydrate and everything is concentrated on top of the hydrate layer.

Guava juice was separated/concentrated using a hydrate filter. 50 mL of guava juice was added on top of gel and allowed to be filtered. Concentrated guava juice was collected on top of the hydrate gel layer. Similarly the filtrate was clear without any signs of pigments. No pigment could penetrate into the depth of hydrate and everything is concentrated on top of the hydrate layer.

Similar successful separation/concentration of peach juice, pear juice, nectarine juice and apple juice was also obtained.

Extract Pigments, Hydrophobic Components and Medicines from Flowers, Leaves and Other Parts of Plants It is possible to extract valuable compounds, pigments, medicines and even carotenoids from variety of plants, their parts (e.g. their leaves and flower) using this technology. For example, yellow pigments of *Tipuana tipu* tree flowers extracted using this technology. *Tipuana tipu* tree flowers were collected from gardens at the University of Queensland. They were smashed in a pestle and by adding a little bit of water a yellow juice seperated from leaves. 50 mL of extracted yellow liquid was first filtered using a low pore fabric and then was added on top of a gel (thicker hydrate gel made at 100 C) and allowed to be filtered. This resulted in separation of the yellow pigments. Similarly the filtrate was clear without any signs of yellow pigments. No yellow pigment could penetrate into the depth of hydrate and everything is concentrated on top of the hydrate layer.

Coffee Concentration

Most flavours in coffee are hydrophobic. Therefore, they cannot pass through the hydrate filter. Consequently, a hydrate filter can be used for coffee concentration. The concentrated coffee recovered from the top of the filter contains valuable coffee oils, phenolic, and most flavours. The concentrated coffee obtained using a hydrate filter is a viscous material. It can be added to hot or cold water to make coffee drinks. It is high source of natural antioxidants and phenolic compounds. This paste can be used as food or cosmetics. It can be used as a base for making variety of new food, health food and beauty, or cosmetic products, such as coffee breakfast spreads (similar to Nutella® chocolate spreads), beauty creams, moisturising creams, sun protection creams, hand washing liquids, shower gels, shaving foam, tan sprays, and shampoos. It can be dried easily to make a substance similar to Nescafe®. This dried concentrated coffee can be marketed as an instant coffee similar to Nescafe®.

Figure 14A:
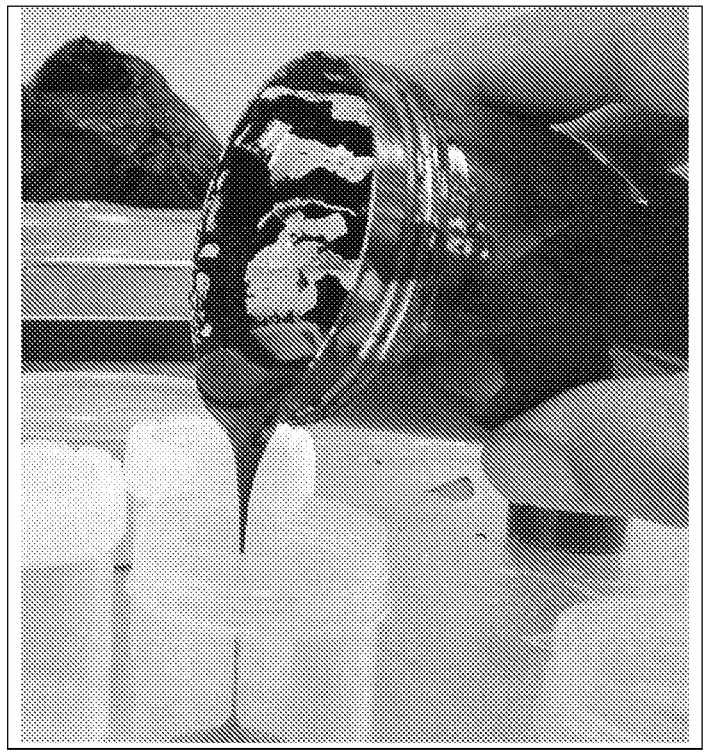
FIG. 14a shows a photograph of the concentrated coffee that was recovered from the top of the metal hydroxide hydrate layer following filtration of coffee with no applied pressure.

It can also be made from spent coffee. The spent coffee soaked in warm or hot water to allow the separation of reminder of oils, hydrophobic flavours and phenolic and antioxidant compounds. In one experiment, after settling for several hours, 15 L of the liquid on top separated from the settled solids. The liquid is added on top of hydrate filter equipment made using a bucket equipped with a geotextile fabric at the bottom and allowed to be filtered. For ease of operation and separation of concentrated coffee, a filter paper was placed on top of hydrate layer, after the hydrates settled and hydrate layer formed. Therefore, at the end of process, the concentrated coffee accumulated on top of paper and could be collected easily by scooping or other similar collection processes. FIG. 14A shows a photograph of the coffee concentrate recovered from the top of the hydrate layer. Similarly the final product can be used to make various food or cosmetic products. For example, different dosages of the concentrated spent coffee were added and mixed to different fragrant free base creams, shower gels, hand washing liquids, or other fragrance free cosmetics formulas for making cosmetics, and different cosmetic products. The final product has the fragrance and scent of fresh coffee and various health benefits compared to conventional petroleum based cosmetic products. The cosmetic products that we made in this way are very stable after very long periods of time and no mould and bacteria growth happened. After several months they still have a smell of fresh coffee as the soaps, shower gel, beauty cream formulas preserve the concentrated coffee.

Figure 14B:
FIG. 14B shows a photograph of the concentrated coffee that accumulated on top of the metal hydroxide hydrate layer following pressure filtration of coffee.

The coffee concentration without pressure happened slowly overnight. However, applying pressure can make the separation process faster. 500 mL of the thick hydrate gel (made at 100 C) added to 1500 mL of water and the solution were added into a dead-end mineral processing laboratory pressure filter unit made by Amdel Company with cross section area of 0.01887 m2. After 15 minutes when the hydrate particles in solution were settled, a filter paper was placed on top of the hydrate layer. The hydrate layer thickness is measured 10 mm. Then 500 mL of liquid coffee which separated from spent coffee were added and 40 psi pressure applied. After about 45 minutes the process finished, and the all hydrophobic components were accumulated and scooped easily from the top of filter paper. FIG. 14B shows a photograph of the concentrated coffee that accumulated on top of the metal hydroxide hydrate layer. The average flux was calculated at 1586.97 (mL/min·m$^2$).

A variety of new products such as natural pigments, health food additives, and new skin care beauty creams from natural sources can be produced based on the technology of the present invention. It is also possible to extract and discover new components from natural sources. Other new concentrated food products can also be made using this technology. For example, conventional processes for making tomato paste use high temperature that destroys several healthy nutrients and vitamins. Heat-sensitive vitamins and nutrients will be preserved in new types of tomato paste made using hydrate filtration technology.

In order to show the benefits of the present invention, carrot juice was centrifuged for 10 minutes at 4000 rpm (10,000×g) and no beta-carotene pigment removal was observed. Therefore, centrifugation at these speeds cannot separate orange beta-carotene pigments from carrot juice. Similar results were observed by centrifugation of other juices such as pomegranate and tomato. Carrot juice was also left in a drying oven (65° C.) to evaporate water. However heating degrades the orange beta-carotene pigments and the beta-carotene pigments denatured to a gum like sticky substance. Therefore, hydrate filtration technology in accordance with the present invention appears to be the only low cost and simple technology to concentrate juices and separate beta-carotene and other pigments from different natural sources and juices.

Example 11

Plasmid DNA Filtration

To determine whether long molecules that dissolve in water can pass the hydrate filtration, plasmid DNA with a length of about 3000 bp was used for this experiment. Hydrate filter gel captures non-polar water-insoluble molecules such as beta-carotene. But water-soluble inorganic molecules such as salt, sugar and chlorophyll passes through the hydrate gel filter. This experiment assesses if the hydrate gel can capture long soluble molecules such as DNA. The plasmid was added to water and polymerase chain reaction (PCR) tests were performed to amplify the plasmid in the filtrate to see if there are any traces of plasmid DNA that could be amplified from the filtrate or if any plasmid passes the hydrate gel filter.

Plasmid pGreen with *Arabidopsis thaliana* HVA22d gene incorporated was used for this experiment. GFP primer was used as a forward primer and an HVA22d gene primer was used as a reverse primer. 70 µL of plasmid (1 µg/µL) was added to a 50 mL Falcon tube of distilled water and mixed. The same filtration equipment of previous experiments was used. The mixture was added on top of the thick gel (made at near 100° C.) and allowed to be filtered. Six different filtrate samples were collected over time. Two controls without filtrations were also added to the PCR samples.

Phusion PCR was used again for these tests. A master mix was made by mixing 7.2 µL of water, 4 µL of 5×HF Buffer, 1.6 µL of dNTPs, 2 µL of forward, 2 µL of reverse primers, and 0.2 µL of Phusion polymerase enzyme. 3 µL of each sample was added to a master mix and transferred into PCR tubes and placed in a PCR machine. The Phusion PCR program was 98° C. for 30 s, followed by 35 cycles (98° C. for 10 s, 65° C. for 30 s, and 72° C. for 30 s) and 72° C. for 10 min, and 16° C. for an extended period of time.

After PCR was completed, a gel electrophoresis method was used for size separation and analysis of DNA. 100 mL (2% w/v) agarose gel with ethidium bromide was used for this experiment. 4 µL of 6× loading dye was added to each PCR tube. 5 µL of 1 kb ladder and 10 µL of each sample were added to the agarose gel wells. The gel was subjected to gel electrophoresis at 100 V for 40 minutes. After the electrophoresis was completed, the gel was placed under the ultraviolet light for visualisation of DNA.

PCR results showed no traces of plasmid DNA in the filtrate, while the positive controls showed that plasmid DNA was amplified. Therefore, these results demonstrate that plasmid DNA molecules are captured by the hydrate gel filter. Thus, it can be concluded that the hydrate filter gel can also capture long water-soluble molecules such as DNA. It is speculated that the long water-soluble molecules cannot fit between the hydroxide particles in the hydrate gel and therefore cannot pass through the gel layer. A variety of new and different lab equipment for DNA separation can be made using this technology. The hydrate gel lab filters can form a new and simple alternative to more expensive and complicated commercial DNA purification kits currently available (e.g. those that rely on DNA precipitation).

Example 12

Microalgae Harvesting and Thickening, Separation of Microalgae Oil in Water Emulsion after Wet Extraction Accumulation of greenhouse gases in the atmosphere is a major environmental problem facing the world. Microalgal species have the potential to be a new renewable source of biofuel feedstock and also provide high value health food products such as omega-3 and carotenoids. Extracted oil from microalgae can be easily converted to biodiesel by transesterification. Biomass can be used as a high source of protein for human nutrition, animal feed or it can be sold as aquaculture feed. The biodiesel market is growing rapidly. For example, in the USA by the end of 2006 biodiesel production increased four-fold (from 2004) to more than one billion US gallons. High-value health food products from microalgae are another rapidly growing area. For example, omega-3 fatty acids occupy a $13 billion market. Carotenoid, which can be extracted from microalgae, has a $1.4 billion market. Phytosterols have a $300 million market. The aquaculture market reached $86 billion in 2009. Microalgae are essential for shrimp, oyster and scallop hatcheries. For example, *Tetraselmis* algae are sold at a price of about $800/kg of dried biomass, due to high costs of cultivation and centrifugation harvesting.

Conventional harvesting processes of microalgae have several problems that can be solved using hydrate filtration technology in accordance with the present invention. Conventional microalgae centrifugation processes for microalgae harvesting are too expensive to make biofuel from microalgae profitable. Further dewatering, drying and solvent extraction are also problematic and expensive, therefore wet oil extraction has been proposed to solve this problem using different technologies such as heating, electrolysis or ultrasonication. Wet oil extraction is not practical yet due to the formation of oil in water emulsions.

Some types of microalgae harvesting technologies such as conventional filtration technologies are algae-specific. For example, different flocculants are needed for different algal species. Multi-cultivation is very hard because harvesting of different types of algae require different harvesting technologies. Cross-contamination in algal culture is a very critical problem. However, hydrate filtration technology is not algae-specific and does not need any pre-treatment such as flocculation. Bacterial growth and contamination is a serious problem for recycling water for algae re-cultivation. Bacterial growth in algal cultures is a major problem of outdoor cultivation systems. The hydrate gel filtration system can also solve this problem by capturing bacteria and fungi in water. This process can be used for water treatment of large-scale algae cultivation plants.

Unlike centrifugation and membrane systems, hydrate filtration systems in accordance with embodiments of the present invention can work without energy and have no moving parts. Its simplicity and low cost make it a suitable alternative for conventional microalgae harvesting processes. It can also solve the main problem of wet oil extraction by breaking oil in water emulsions. It is not algae specific and can harvest any type of microalgae, therefore multi-cultivation and cross-contamination problems are solved using this technology. It also sanitises the water, therefore the filtrate water can be recycled and reused for microalgae cultivation several times.

Different types of microalgal species such as *Tetraselmis striata*, *Chaetoceros muelleri*, and *Dunaliella salina* were successfully harvested and collected on top of an aluminium hydroxide hydrate gel layer using this technology. Even very small species such as *Nannochloropsis* cells (about 2 microns diameter) that are very hard to harvest by conventional technologies, were harvested easily using this technology. The filtrate water was clear without any suspended solids or microalgae. Unlike conventional microalgae harvesting processes that are algae-specific, any type of microalgae can be harvested using this technology. This process does not need any pre-treatment such as flocculation and all contaminants and microalgae are easily collected at top of the hydrate gel. The non-sticky nature of the metal hydroxide hydrate layer allows easy separation of harvested algae and this has been further improved by adding a thin layer of fine fabric or mesh on top of the hydrate gel filter.

High electric charges of aluminium hydroxide molecules in the hydrate gel are another important driving force for dewatering. The hydrate gel not only collects algal species and prevents them from passing the filter, but also naturally dewaters the collected paste more compared to conventional filtration systems. The electric charges of the metal hydroxide hydrate gel naturally draw in the water molecules that are close to the gel surface, resulting in a thicker (less water) algal paste on top of the gel. This facilitates further processing such as drying and oil extraction.

Figure 15:
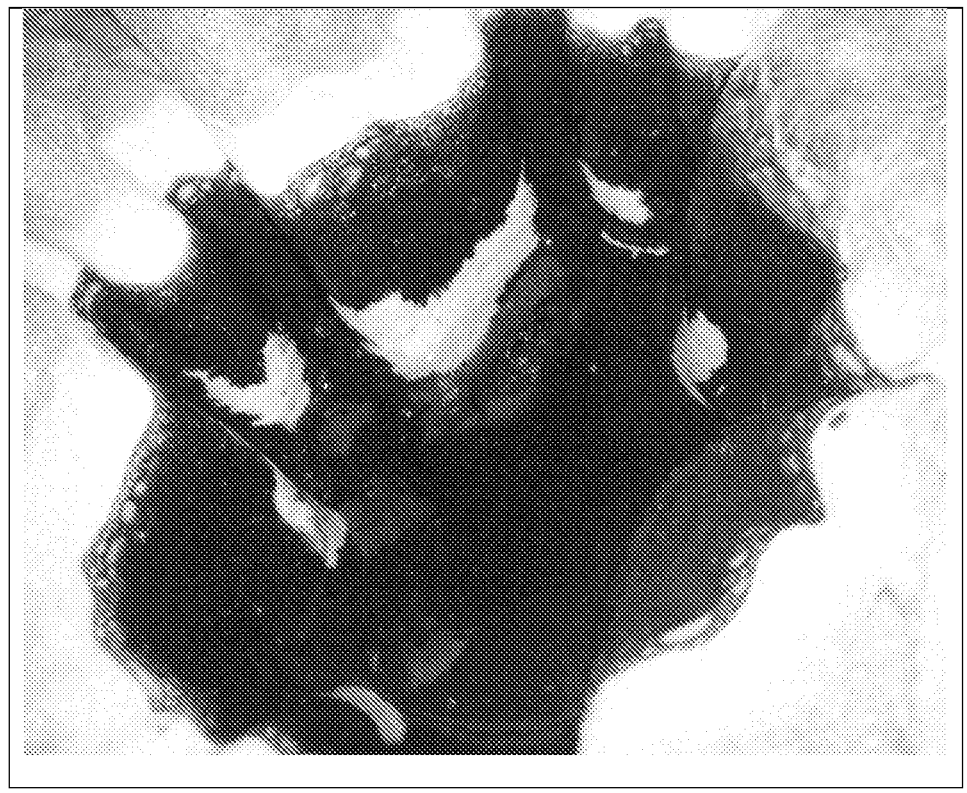
FIG. 15 shows a photograph of algae cells retained on top of the hydrate gel following separation of the algae cells.

FIG. 15 shows how a hydrate filter separates micron-sized microalgae (*Nannochloropsis*) from water. Bidim nonwoven A64 Geotextile with a pore size of 80 micron and permittivity of 0.8 $s^{-1}$ was used under the aluminium hydroxide hydrate gel that was made by electrolysis (9 V, 1 amp) of saline water (70 PPT) or a reaction-based hydrate gel was made by mixing stoichiometric saturated solutions of aluminium sulphate and sodium bicarbonate (1 mole of aluminium sulphate+6 moles of sodium bicarbonate). FIG. 15 shows that due to the non-sticky nature of the gel, the algal paste naturally separates from the gel. However, a more practical solution is using a cylindrical filtration equipment similar to the equipment used in the filtration tests of the previous examples. It allows a consistent spread of algal paste (the same depth across the top of the gel layer) for the ease of further processing such as drying. Therefore, thickening and collecting the paste and spreading it can be simplified in a single step. It facilitates further drying processes such as solar drying. Furthermore, the pressure of the column of water and the water molecule suction of the gel dewater the paste more. A piece of fabric (or similar media) can be put on top of the gel before filtration. This hinders disruption of the gel during filling. It will also make it easier to collect the algal paste after each harvesting cycle when desired thickness of paste achieved by simply lifting the top piece of fabric.

Figure 15A:
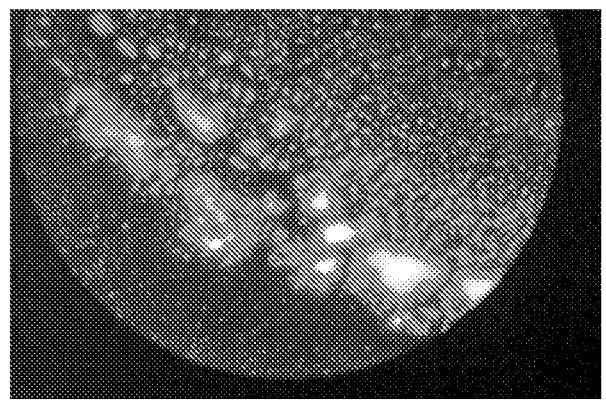
FIG. 15A shows a photograph of the Nile red-stained oil that was collected on top of an aluminium hydroxide hydrate filter from an oil in water emulsion.

Heat or sonication can cause algal cells to burst and release their lipid bodies as oil in the surrounding water. The oil in water emulsion cannot be skimmed off the surface. The separation of oil from oil in water emulsion is a current problem that can be solved using hydrate filtration technology. Algal cells were pretreated so that the cells burst and oil was released in the water resulting in an oil in water emulsion. 50 mL of this emulsion was filtered using 30 mL of thick gel (made at near 100° C.) as a layer. The microscopic Nile red lipid staining test shows that the lipids from the algal oil emulsion were separated and captured on top of the gel. The filtrate was crystal clear water with no sign of algae or oil droplets. A photograph of the Nile red-stained oil that was collected on top of an aluminium hydroxide hydrate filter from such an oil in water emulsion is shown in FIG. 15A.

Figure 16:
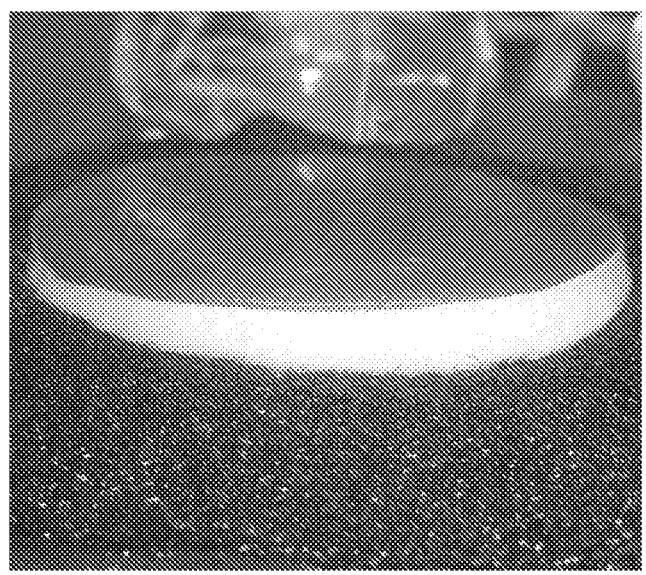
FIG. 16 shows a photograph of a side view of the hydrate gel after removal of *Scenedesmus* algae cells.

*Haematococcus pluvialis* algae have a high content of the strong antioxidant astaxanthin, which is a carotenoid with a variety of health benefits and that is in high demand for health food products, aquaculture, pharmaceuticals, and cosmetics industries. The market value of astaxanthin is very high at about US$3000 per kg. 150 mL of *Haematococcus pluvialis* algae were added on top of an aluminium hydroxide hydrate gel (made at 20° C.). The *Haematococcus* cells were harvested and the filtrate was clear water. Similarly 150 mL of *Scenedesmus* sp. strain NT8C was added on top of an aluminium hydroxide hydrate gel (made at 20° C.). Again, the *Scenedesmus* cells were captured on top of the hydrate layer. FIG. 16 shows the cross-section view of the gel after filtration. It shows the algal cells collected on top of the gel. The algal cells did not penetrate into the gel but rather they accumulated on top of the gel. This facilitates further the separation of algal cells. The self-supporting nature of the aluminium hydroxide hydrate gel is also shown in FIG. 16. The gel is shown as the white mass in FIG. 16. The dark geotextile fabric can be seen underneath the gel in FIG. 16.

Example 13

Alcohols Pass the Hydrate Filter

Alcohols such as methanol and ethanol are polar and water soluble. Therefore they should pass through the hydrate gel. To test this, 50 mL of pure ethanol and methanol were added to the top of an aluminium hydroxide hydrate gel made at near 100° C. (formula (1)). This test confirmed that both methanol and ethanol molecules pass the hydrate filter. However they passed slower than water, due to their different polarity compared to water molecules. This test revealed that even after 2 hours although all water molecules of a control water test had passed the filter, some alcohol was still on top of the hydrate. Molecular polarity is a relative term with one molecule simply being more polar or more nonpolar than another. This phenomenon can be used to quantify and measure relative polarities of different molecules compared to water. Different new lab equipment such as molecular polarity meters could be made based on the hydrate filtration system. Depending on the filtration rates of different polar molecules their relative polarity compared to water can be quantified.

To test whether the alcohol molecules passed the hydrate or replaced the water molecules in the hydrate; the gels after filtration were left under a fume hood for about 20 hrs. Methanol and ethanol boiling point are very low and they evaporate in several minutes if left under the fume hood. If the hydrate gel is converted to alcohol hydrate gel, the alcohol should evaporate fast and dried aluminium hydroxide should remain after several minutes or hours. However, this test revealed that after about 20 hours there was no difference between the control hydrate gel used for water filtration and the hydrate gel used for alcohol filtration. Therefore, alcohol molecules could pass through the hydrate gel but do not appear to replace water molecules in the hydrate.

Example 14

BSA Proteins Pass the Hydrate Filter

Bovine serum albumin (also known as BSA or "Fraction V") is a serum albumin protein derived from cows. It is often used as a protein concentration standard. Crystallised BSA powder was mixed with distilled water to make BSA solution. 50 mL of 1 millimole/L (3.3 g/50 cc) of BSA solution was added on top of super thick hydrate gel (made at near 100° C.). However, the filtrate was yellow and not completely clear and this shows that BSA molecules could pass the hydrate filter.

Example 15

Other Metal Hydroxide Hydrates

Although aluminium hydroxide hydrate gel is the material of first choice for water purification and industrial applications due to its nontoxic nature, strong homogenous gelatinous layer, fast dewatering rate, and availability and low cost, and ease of production by mixing two non-toxic chemicals (aluminium sulphate and sodium bicarbonate), other metal hydroxide hydrates can also be used for some industrial applications where toxicity is not a key issue.

Other metal hydroxide may be toxic and hazardous, and also cannot be made by reaction of their sulphates with sodium bicarbonate. They mostly can be made by mixing their salts (such as their sulphates, nitrates and chlorides) with sodium hydroxide (caustic soda). They can also be made by electrolysis. For example, copper hydroxide hydrate can be made by electrolysis of a saturated solution of magnesium sulphate with copper electrodes and DC current.

The same molecular structure which was explained for aluminium hydroxide also applies for other metal hydroxide hydrates. When hydrate forms, water molecules are trapped in between a net of metal hydroxide molecules but not bonded to the metal hydroxides. Trapped water molecules are attracted to positive and negative charges of the metal hydroxide molecules, and therefore they are not bonded to metal hydroxide molecules and can easily and naturally leave the hydrate. Therefore, water can pass through the "net". The impurities such as bacteria, fungi, viruses, suspended solids, and non-polar hydrophobic molecules are also expelled to the top of the hydrate gel, due to strong electric charges of the hydrate gel.

This hypothesis also applies for other metal hydroxide hydrates, such as magnesium hydroxide hydrate gel, manganese hydroxide hydrate gel, cobalt hydroxide hydrate gel or nickel hydroxide hydrate gel. However, the properties of different hydrate gels are different due to different natures and chemical properties of different metals. For example, the flow rate, thickness and pore sizes of the hydrate precoats made of different hydrate gels is different. Therefore different materials may be separated using different hydrate gel precoats. However, due to the high toxicity nature of other metal hydroxide hydrates and using hazardous chemicals (e.g. sodium hydroxide) for their production, their application will be limited to some specific uses such as chemical, or petrochemical or oil refineries. Carrot juice (for the isolation of beta-carotene) was used to examine different metal hydroxide hydrates in the following examples, as this allows easy visualisation.

Magnesium Hydroxide

Magnesium hydroxide hydrate can be made by the following equation.

$$MgSO_4 + 2NaOH \rightarrow Na_2SO_4 + Mg(OH)_2 \quad (2)$$

Magnesium sulphate solution was made by mixing 86.68 g of magnesium sulphate heptahydrate in 500 mL of distilled water. 11.59 g of sodium hydroxide was mixed in 50 mL of distilled water. By adding sodium hydroxide solution to the magnesium sulphate solution, the magnesium hydroxide hydrate gel was made. The same filtration equipment used for previous experiments was used. However, another very low pore size fabric (boardshort fabric) was used under the geotextile to capture all magnesium hydroxide hydrate gel. The hydrate gel was added on top of the geotextile. Carrot juice was added on top of the hydrate gel and allowed to be filtered.

Although, magnesium hydroxide hydrate settled very slowly compared to aluminium hydroxide hydrate, the filtrate was clear due to using lower pore size fabric under the hydrate. All visible beta-carotene molecules were expelled or captured on top of the magnesium hydroxide hydrate gel. The filtrate was very clear with no signs of beta-carotene pigments.

Zinc Hydroxide

Zinc hydroxide hydrate can be made by the following equation.

$$ZnSO_4 + 2NaOH \rightarrow Na_2SO_4 + Zn(OH)_2 \quad (3)$$

Zinc sulphate solution was made by mixing 10.27 g of zinc sulphate heptahydrate in 50 mL of distilled water. 1.39 g of sodium hydroxide was mixed in 10 mL of distilled water. By adding sodium hydroxide solution to the zinc sulphate solution, the zinc hydroxide hydrate gel was made. The same filtration equipment used for previous experiments was used. The hydrate gel was added on top of a geotextile. Carrot juice was added on top of the hydrate gel and allowed to be filtered.

All visible beta-carotene molecules were expelled and captured on top of zinc hydroxide hydrate gel. The dewatering flow rate was very fast. Kerosene was also added on top of the zinc hydroxide hydrate gel. Similar to aluminium hydroxide hydrate, the results showed that no kerosene passed through the zinc hydroxide hydrate. Another interesting behaviour of zinc hydroxide hydrate is that after being under the kerosene for a long time, the hydrate layer will be more compact and harder compared to other metal hydroxide hydrates. The compacted layer still only allows the water molecules to pass. Even harsh refilling of the zinc hydroxide hydrate layer did not destroy the layer. Therefore zinc hydroxide hydrate has a very high potential to be used in water hydrocarbon separation units, or used under very high pressure, or to be used at the bottom of kerosene and other hydrocarbons storage tanks for separating water and other polar impurities from hydrocarbons such as kerosene.

Copper Hydroxide

Copper compounds are toxic. Copper hydroxide hydrate gel was made by the following reaction:

$$CuSO_4 + 2NaOH \rightarrow Cu(OH)_2 + Na_2SO_4 \quad (4)$$

Copper sulphate solution was made by mixing 24.96 g of copper (II) sulphate pentahydrate in 200 mL of distilled water. 7.998 g of sodium hydroxide was mixed in 10 mL of distilled water. By adding sodium hydroxide solution to the copper sulphate solution, the copper hydroxide hydrate gel was produced. However the moist samples of copper (II) hydroxide turned black due to the formation of copper(II) oxide. Therefore, the precoat passed the fabric and copper-based hydrate gels could not be used for different industrial applications.

Manganese Hydroxide

Manganese compounds are toxic. Manganese hydroxide hydrate gel was made by the following reaction:

$$MnSO_4 + 2NaOH \rightarrow Mn(OH)_2 + Na_2SO_4 \quad (5)$$

Manganese sulphate solution was made by mixing 16.89 g of manganese sulphate monohydrate in 50 mL of distilled water. 7.998 g of sodium hydroxide was mixed in 10 mL of distilled water. By adding sodium hydroxide solution to the manganese sulphate solution, the manganese hydroxide hydrate gel was produced. The same filtration equipment used for previous experiments was used. The hydrate gel was added on top of a geotextile. Carrot juice was added on top of the hydrate gel and allowed to be filtered.

Manganese hydroxide oxidises quickly if it is not in water and is exposed to the air. Therefore finding real industrial application is very hard for this hydrate gel. The dewatering happens very slowly, however overnight all beta carotene pigments were expelled and captured on top of the gel and the filtrate was very clear. However, the manganese-based hydrate gel was softer. The colour of beta-carotene pigments on top of the hydrate had also changed from orange to dark brown.

Cobalt Hydroxide

Cobalt compounds are toxic. Cobalt(II) hydroxide hydrate gel was made by the following reaction:

$$CoCl_2 + 2NaOH \rightarrow Co(OH)_2 + 2NaCl \tag{6}$$

Cobalt chloride solution was made by mixing 4.34 g of Cobalt (II) chloride hexahydrate in 100 mL of distilled water. 0.7998 g of sodium hydroxide was mixed in 10 mL of distilled water. By adding sodium hydroxide solution to the cobalt chloride solution, the cobalt hydroxide hydrate gel was made. Carrot juice was added on top of the hydrate gel and allowed to be filtered.

The cobalt hydrate gel did not settle fast. The dewatering rate was very slow. However, overnight the beta-carotene molecules were expelled and captured on top of the cobalt hydroxide hydrate gel. The beta-carotene pigment's colour also turned to dark brown. The filtrate was light red because of the traces of excess cobalt chloride.

Nickel Hydroxide

Nickel compounds are highly toxic and can cause cancer or heritable genetic damages. Nickel hydroxide hydrate gel was made by the following reaction:

$$NiSO_4 + 2NaOH \rightarrow Ni(OH)_2 + Na_2SO_4 \tag{7}$$

Nickel sulphate solution was made by mixing 8.94 g of nickel sulphate hexahydrate in 150 mL of distilled water. 1.279 g of sodium hydroxide was mixed in 20 mL of distilled water. By adding sodium hydroxide solution to the nickel sulphate solution, the nickel hydroxide hydrate gel was made. Carrot juice was added on top of the hydrate gel and allowed to be filtered.

Unlike aluminium hydroxide hydrate gel, the nickel hydroxide hydrate gel did not settle fast and make a homogenous gel layer rapidly. The dewatering rate was very slow. However, overnight the beta-carotene molecules were expelled and captured on top of the nickel hydroxide hydrate gel. The beta-carotene pigment's colour also turned to dark brown.

Comparative Example

Reaction with Sodium Bicarbonate

One of the most important advantages of aluminium hydroxide hydrate gel compared to other metal hydroxide hydrates is that it can be made very simply by the reaction of its sulphate solution with non-toxic sodium bicarbonate (baking soda) solution. Other metal hydroxide hydrate gels can be made using sodium hydroxide or by more expensive and slower electrolysis. However, other metal hydroxide hydrate gels cannot be made using baking soda. For example, magnesium sulphate solution was added to sodium bicarbonate solution and no magnesium hydroxide hydrate generation was observed.

Zinc sulphate reacts with sodium bicarbonate by the following reaction:

$$ZnSO_4 + 2NaHCO_3 \rightarrow ZnCO_3 + Na_2SO_4 + H_2 \tag{8}$$

However, unlike aluminium sulphate reaction with baking soda, no hydrate gel of zinc hydroxide was made. The zinc carbonate precipitated. Zinc carbonate precipitates were added on top of a geotextile fabric, but unlike zinc hydroxide hydrate gel, no homogenous gel-like layer was formed on the fabric. Unlike metal hydroxide hydrate gels which are highly charged and retained the beta-carotene molecules on the top of the hydrate gel, zinc carbonate could not separate beta-carotene. All beta-carotene molecules passed to the depth of zinc carbonate precipitate layer and passed through the layer. At the end of the process the entire layer was orange, unlike metal hydroxide hydrates where only the top section was orange and all beta-carotene molecules were expelled to the top. This is the main difference between normal precipitates and metal hydroxide hydrate gels.

Example 16

Other Ways of Making Aluminium Hydroxide Hydrate Gel

Although making aluminium hydroxide hydrate gel is preferred by mixing non-toxic chemicals of aluminium sulphate and baking soda or electrolysis of saline water due to their non-toxic nature, there are two other reactions that make aluminium hydroxide hydrate gel using toxic and hazardous chemicals:

$$Al(Cl)_3 + 3NH_4OH \rightarrow Al(OH)_3 + 3NH_4Cl \tag{9}$$

200 mL of semi skimmed milk was added on top of a hydrate gel made by mixing aluminium chloride and ammonium hydroxide ($NH_4OH$) solutions. The same results obtained from similar tests using aluminium hydroxide hydrate gel made by mixing aluminium sulphate were observed. Milk concentrated on top of the hydrate gel and the filtrate was reasonably clear. Therefor the aluminium hydroxide hydrate gel made by the above reaction has the same filtration properties as aluminium hydroxide hydrate gels generated from non-toxic chemicals.

Another way to make aluminium hydroxide hydrate gels is by mixing aluminium nitrate which is a very unstable chemical and a strong oxidising agent, with sodium hydroxide solution by the following equation.

$$Al(NO_3)_3 + 3NaOH \rightarrow Al(OH)_3 + 3NaNO_3 \tag{10}$$

Although reactions (9) and (10) can make aluminium hydroxide hydrate gel, they cannot be used for water treatment and food related applications, due to the toxicity of the ingredients used.

Example 17

Concentration of Water-Based Liquids, Such as Fruit Juices

The transportation and preservation of fresh fruit juices is very expensive. For this reason many juices undergo a concentration process, for example by evaporation using heat. Heat often changes the nutritional value as many vitamins and flavours are lost during this process. The concentrated juice sometimes has a cooked or bitter taste due to heating. Furthermore, heating is not desirable for some juices, such as carrot juice, because the heat denatures beta-carotene, and carrot juice will be converted to a sticky gum-like material that cannot be diluted to carrot juice again.

However, concentration of juices by hydrate filtration in accordance with embodiments of the present invention has the potential to keep most nutrients, pigments, flavours and smells in the concentrate. For example, a reconstituted carrot juice has a very similar smell as fresh carrot juice. The hydrate filter can concentrate the carrot juice approximately up to 70 times to a paste-like material. The paste can be packaged in a variety of containers for a variety of products, such as ultra-concentrated carrot juice paste, nutraceuticals, feedstock for beta-carotene extraction, natural skin care or beauty products and other similar cosmetics or food products. It can also be added in different concentrations as additives to a variety of food or cosmetics products.

The concentrated paste can be redissolved or mixed in water, e.g. for the production of reconstituted juice. The product appears similar to fresh carrot juice, although salts and sugars have passed through the hydrate filter and would need to be added for reconstitution. This juice does not tend to settle over time, unlike many reconstituted juices made from heated concentrate. Similar concentrated pastes have been produced from other juices, such as tomato and pomegranate. The concentrated paste can also be rapidly air-dried to make a powder that can be used as natural food pigments and/or health food additives. This powder can be mixed with water to make carrot juice-like drinks.

Other liquids have also been tested with similar results. These include coffee and tea to make concentrated paste or powder without losing essential flavours.

Limitations to this technology for concentrating liquids exist for small hydrophilic compounds that can pass the hydrate filter unhindered. These include water-soluble salts, sugars, alcohols and some hydrophilic secondary metabolites, such as chlorophyll. Another limitation exists for highly acidic liquids, such as some lemon or orange juices, which may react with aluminium hydroxide.

Example 18

Comparison of Thicker Hydrate Gel (Made at Near 100° C.) to Normal Hydrate Gel (Made at 20° C.)

Thicker hydrate gels (made at near 100° C.) have less water molecules compared to normal hydrate gels (made at 20° C.), therefore the electric charges of aluminium hydroxide molecules on each water molecule is higher. That is why dewatering occurs more slowly using thicker hydrate gel. However, tests show that the quality of filtrate is the same. Therefore, because of the ease of production the normal gel is preferred for normal applications. However, for industrial applications such as some pressure or vacuum applications the thicker gel may be preferred.

To compare the performance of thicker and normal gels, 55 mL of thick gel and normal (thin) gel were added on top of the fabric. The same volume of water (400 mL) was added on top of the respective hydrate gels. Time was recorded for every 50 mL decrease in water level. As expected, dewatering occurred more slowly using thick gel. The results show that dewatering happens nearly 2 times faster using normal hydrate gel (made at 20° C.) compared to thicker gel (made at near 100° C.).

To compare the performances of different gels, the same volume of carrot juice was added on top of a thick gel (made at near 100° C.) and normal gel (made at 20° C.) hydrate gels. There was no difference between the filtrate quality and retained pigments between the filtration using thick hydrate gel and the normal hydrate gel.

Hydrate Filtration Under Pressure

For industrial applications faster processes are desired. The hydrate filter tested under pressure up to 100 psig. A mining processing laboratory pressure filter made under AS 1210 class 3 standards by Amdel company is used for pressure filtration tests. The pressure is adjustable up to 100 psig (6.8 atm). A low pore fabric is placed on the bottom of the filter. A 2 micron pore size filter paper (Macherey Nagel, MN1640D, 185 mm Dia) is also placed on top of the fabric to retain the hydrate under pressure. The diameter and cross section area of this equipment are 0.155 m, 0.01887 m2 respectively. The filtrate drained through a hole in the middle.

To select the best operating pressure for each filtration process, a pressure-flux curve is used. For each experiment first we added the 100 mL of thick hydrate solution (made at 100 C) to 2 L of de-mineralised water. This solution were added to the pressure filter equipment and allowed the hydrate particle to be settled for 10 minutes. After the hydrate particles settled and a consistent hydrate layer with the thickness of about 1 mm is formed, different pressures were applied. The filtrate were collected in a beaker and weighted over time. Based on this data the fluxes were calculated. During each filtration test, the flux is calculated 11 times in 2 minutes periods. The changes in average fluxes by pressure were measured.

This shows that the hydrate filter works very fast at very low pressures. It shows that from 10 to 80 psi by increasing pressure no increase in flux occurs. Therefore, based on this curve, the best operating pressure for this technology should be between 0 to 10 psi. However, more flux-pressure tests needed using higher pressure equipment (above 100 psi up to 1000 psi or more). These results prove because most of the hydrate layer is water, it works remarkably fast at very low pressures. Just a little bit of pressure needed to gently push the water molecules through the hydrate layer. Therefore, unlike conventional membranes that only work under very high pressures, by using this technology, we can save lots of costs. (e.g. saving huge capital and operating costs of equipment, energy, safety and maintenance associated with using conventional high pressure membranes).

Compare Evaporation Rates of Different Hydrates

Figure 17:
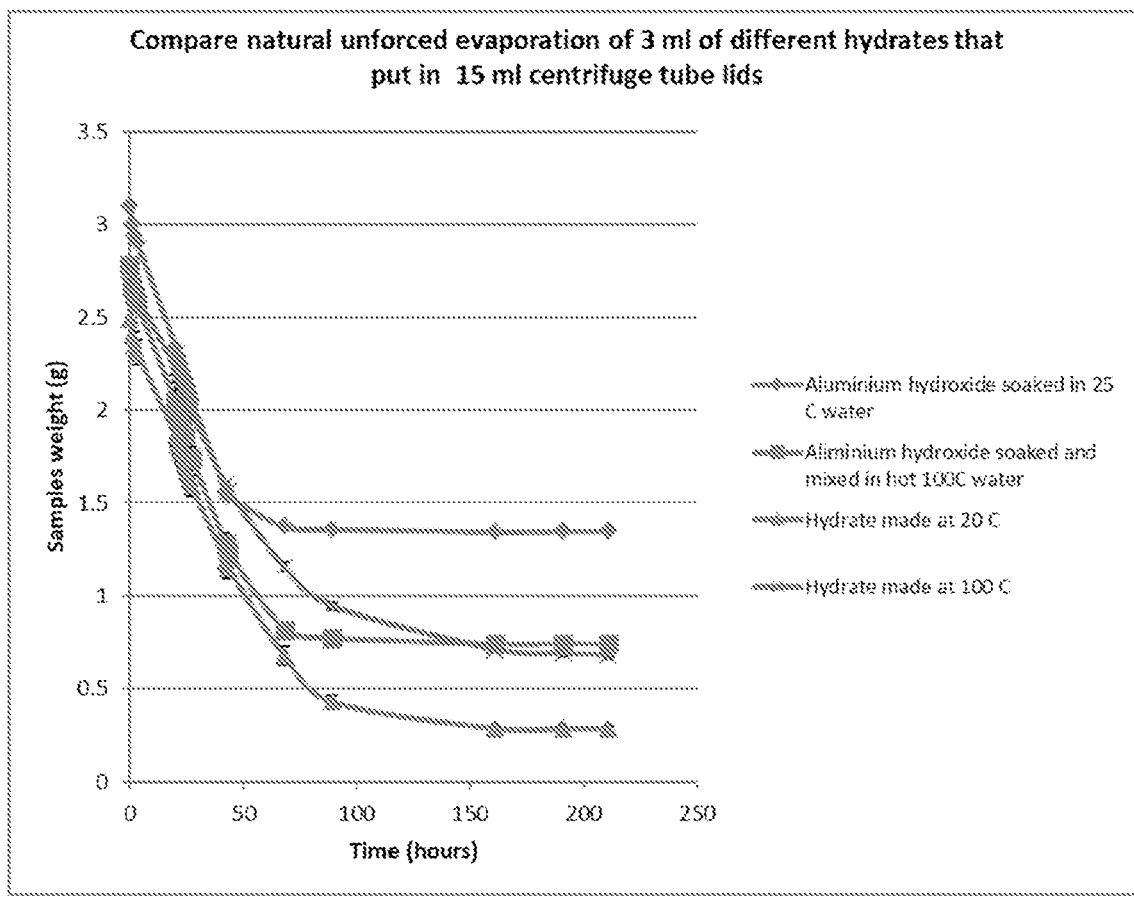
FIG. 17 shows a graph showing natural unenforced evaporation of different metal hydroxide hydrates.

Although it is very hard to assess the hydrate structure under electron microscope, it is possible to investigate the effects of metal hydroxide hydrate forces by investigation of the evaporation rate of the metal hydroxide hydrate made by reaction or electrolysis compare to metal hydroxide hydrates made by soaking metal hydroxide powder in cold water or soaking and mixing metal hydroxide powder in hot water. FIG. 17 shows the natural unforced drying of different hydrate samples in centrifuge tubes lids over time in room temperature. The results show that hydrates made by soaking completely dried after 60 hours. However, the hydrate gels still keep some water molecules and they dried after about 160 hours. Furthermore, and more importantly at the end of process, soaked hydrates of aluminium hydroxide dried out to aluminium hydroxide powder with white colour, however aluminium hydroxide hydrate gels transformed to a hard crystal material after losing water molecules by evaporation. The results show some inner molecular forces or the crystal, matrix or net shape of the hydrate gel keeps the water molecules in the hydrate gel and prevent fast evaporation of water molecules in the hydrate.

Effect of Pressure and Hydrate Thickness on Filtering

The effect of pressure and hydrate thickness were investigated. The filtration equipment included a lid that could be closed to allow pressurisation by compressed air. For each experiment first we added the hydrate solution. Then after the hydrates settled and the hydrate layer formed, the liquid mixture (either 1800 ml of Brisbane river water or 200 ml of carrot or watermelon juices) were added. Then the lid was closed and compressed air pressure was applied and adjusted. The filtrate was collected in a beaker and weighed over time to measure the flow rate and flux.

Figure 18A:
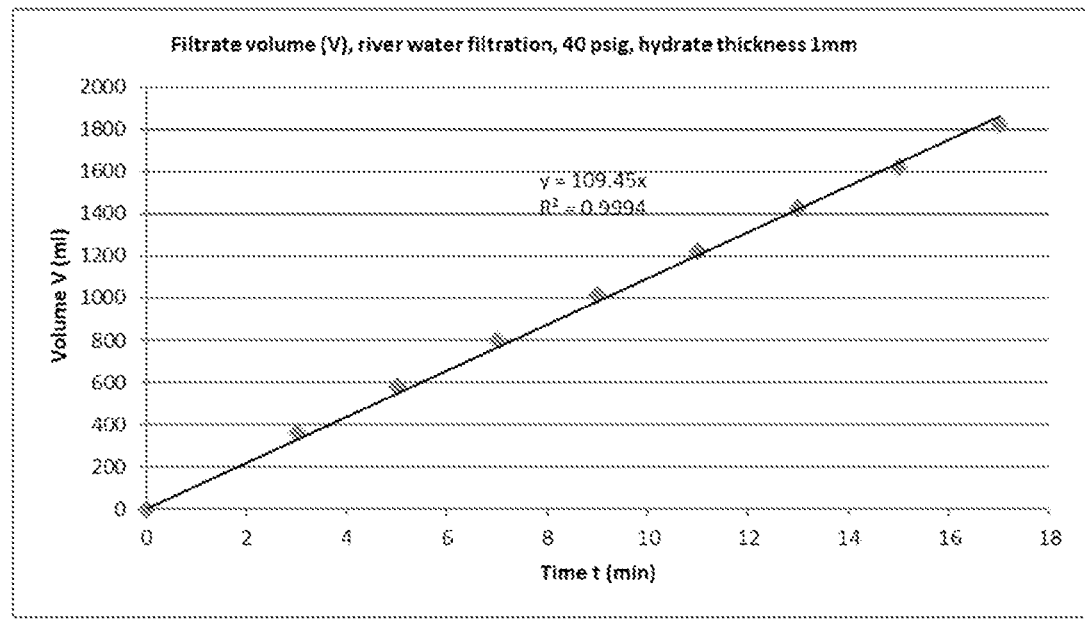
FIG. 18A shows a graph of filtrate volume versus time for filtration of Brisbane River water using an applied pressure of 40 psig and a hydrate thickness of 1 mm.
Figure 18B:
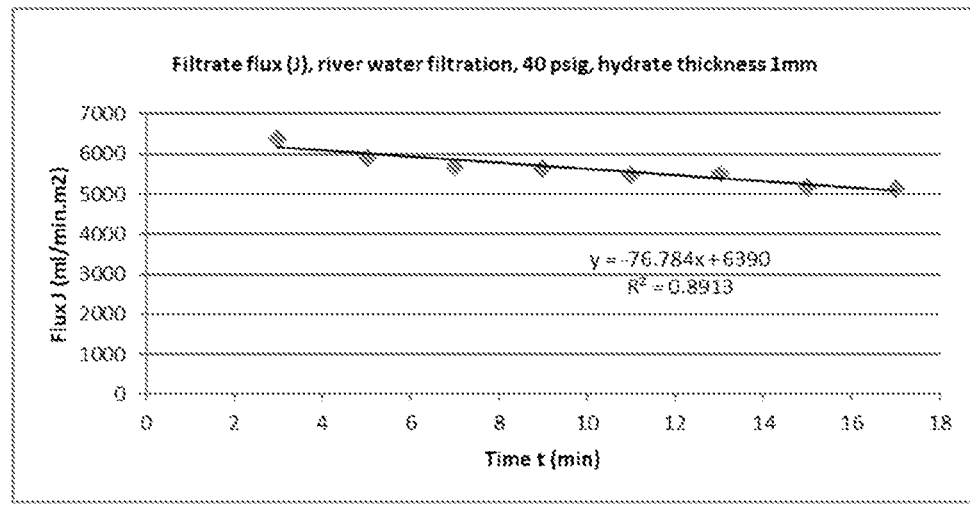
FIG. 18B shows a graph of filtrate flux versus time for filtration of Brisbane River water using an applied pressure of 40 psig and a hydrate thickness of 1 mm.
Figure 18C:
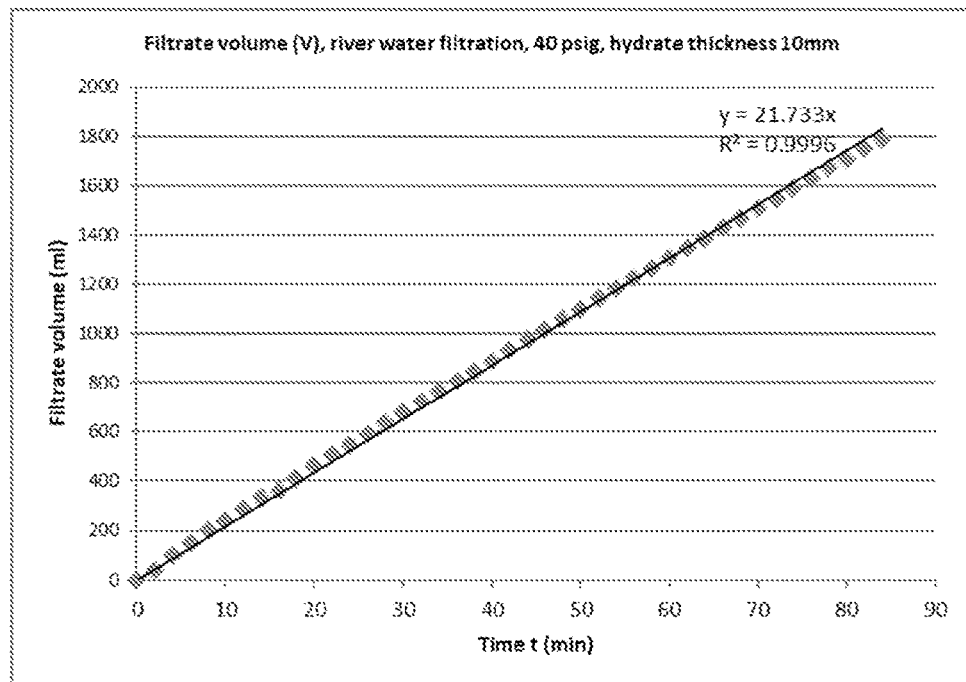
FIG. 18C shows a graph of filtrate volume versus time for filtration of Brisbane River water using an applied pressure of 40 psig and a hydrate thickness of 10 mm.
Figure 18D:
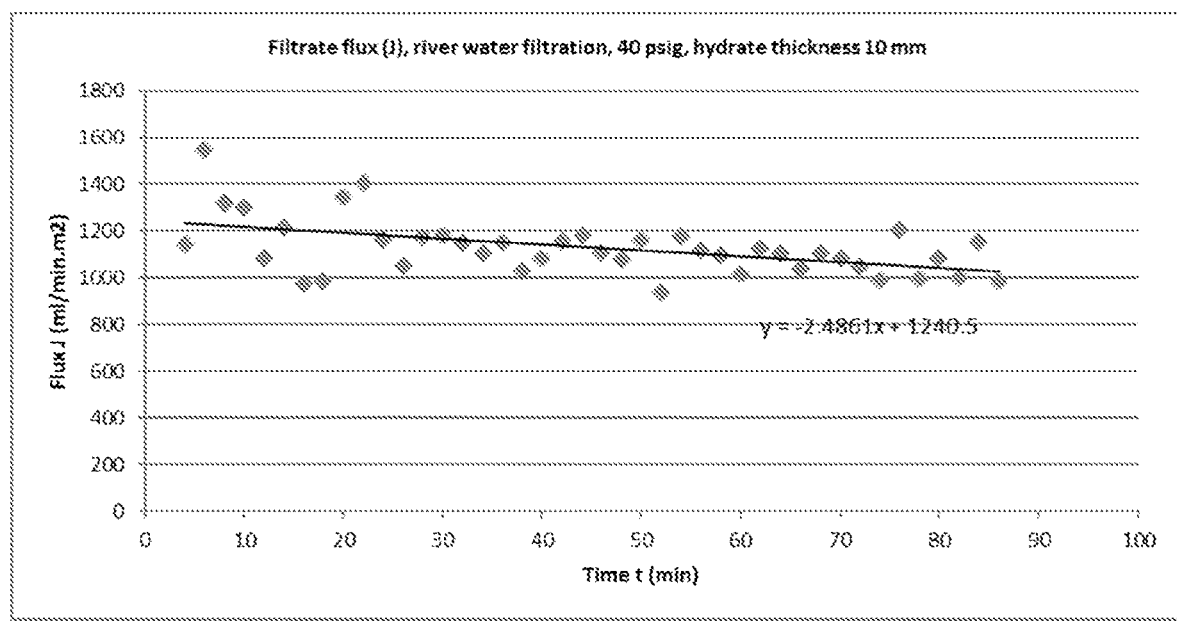
FIG. 18D shows a graph of filtrate flux versus time for filtration of Brisbane River water using an applied pressure of 40 psig and a hydrate thickness of 10 mm.

We added the turbid Brisbane river water with the optical density (at 440 nm) of 0.203 on top of aluminium hydroxide hydrate layer using thick hydrate (made at 100° C.) with a thickness of 10 mm. The results are shown in FIGS. 18C and 18D. The average flow rate and average flux were measured 106.1 (ml/min), 5622.1 (ml/min·m$^2$) respectively. Although the filtration time was very fast, the filtrate was clear with the optical density (at 440 nm) of 0.000. The hydrate did not dry out under high pressure due to its unique gelatinous nature. Even under high pressure no impurity could penetrate into the depth of the hydrate layer. The experiment was repeated using a thinner hydrate layer with thickness of 1 mm. The results are shown in FIGS. 18A and 18B. Similarly, the filtrate was clear but the flow rate and flux was about 5 times faster compared to the hydrate layer with a thickness of 10 mm. The average flow rate and average flux were measured 21.3 (ml/min), 1128.6 (ml/min·m$^2$) respectively.

Similarly we added carrot and watermelon juices for faster separation and concentration. Even under very high pressure (100 psig) no beta-carotene or lycopene molecule could penetrate in depth of the hydrate gel. The juices were concentrated to a very thick orange or red paste on top of the hydrate layer. This allows for easy separation of concentrated juices. The filtrate was clear. For example, the filtrate of watermelon juice was as clear as demineralised water with optical density (at 440 nm) of 0.000. The flow rate was reasonably fast even under low or medium pressure. For example, for watermelon juice filtration under just 10 psig (0.68 atm), the average flow rate and flux were measured at 30.7 (ml/min), 1625 (ml/min·m$^2$) respectively. These results prove that this process can be used at an industrial scale under elevated pressures to obtain higher filtration rates. This technology has the potential to be a new generation of filtration and separation technologies. Using different types of metal hydroxide hydrate, with different molarity of ingredients, and different preparation conditions (e.g. making different supersaturated solutions of the ingredients under different temperatures and pressures), or even mixing hydrates of different metals, numerous types of metal hydroxide hydrates can be made. These hydrates will have different filtration properties. Therefore, with different relative molecular polarity and hydrophobicity of different molecules, different molecules will pass or retained on different types of hydrates. Gravity alone can result in efficient separation, although the process can be accelerated by pressure application for industrial purposes.

Pressure Filtration of Juices and Making to Produce New Healthy Fruits Butters 700 mL of carrot juice was subjected to pressure hydrate filtration. A filter paper (2 micron pore) was placed on top of pressure filter equipment. 50 mL of thick hydrate gel (made at 100 C) was mixed in 1500 mL of demineralised water and poured on top of the filter paper. 40 psig pressure was applied for 4 minutes. This allowed the settling of the hydrates in the solution and making a thin (about 1 mm thickness) and consistent and stable layer of hydrate on top of the filter paper. During this stage, about 750 mL of the water of solution passed the filter, however still 750 mL of water remained on top of hydrate. 700 mL of carrot juice was added. Then 80 psig pressure was applied. At the end of the process a thick butter like orange paste was accumulated on top of the hydrate layer. This paste (or other similar concentrated pastes from other fruits) can be used to make variety of new food and cosmetic product. For example, new breakfast spreads such as carrot, watermelon, tomato, pomegranate, cayenne pepper, apricot, *papaya*, mango, rockmelon, passionfruit, guava, peach, pear, nectarine, and similar fruits butters can be made. These healthy butters can be replaced conventional unhealthy milk or oil based butters that have high amounts of unhealthy saturated and trans fats. Unlike milk butter, they not only do not increase cholesterol level that causes heart diseases, but also have variety of health benefits. It can also be added to other spreads such as butter for colouring or adding nutritional values or tastes. Similarly this paste can be used for making new cosmetic products such as beauty creams, masks, soaps or shoer gels, shampoos, sun protection creams, or natural spray tanning products. The high pressure also made the hydrate layer harder than the orange paste collected on top. Therefore, separation of collected carrot juice paste was easy by just scooping.

Another experiment also showed that milk could be successfully concentrated using pressurised hydrate filtration.

Thin Hydrate Layers

As no contaminants or harvested materials can penetrate into the depth of hydrate, it is possible to make the hydrate layer as thin as possible. This not only decreases the cost of the process, but also increases the flow rate during filtration. We made the hydrate layer thickness as thin as micron size (for example, under 500 microns, or in the order of tens of microns, or even under 10 microns) by the following process. The following process also makes the thickness of hydrate layer constant across the filter media.

Figure 19A:
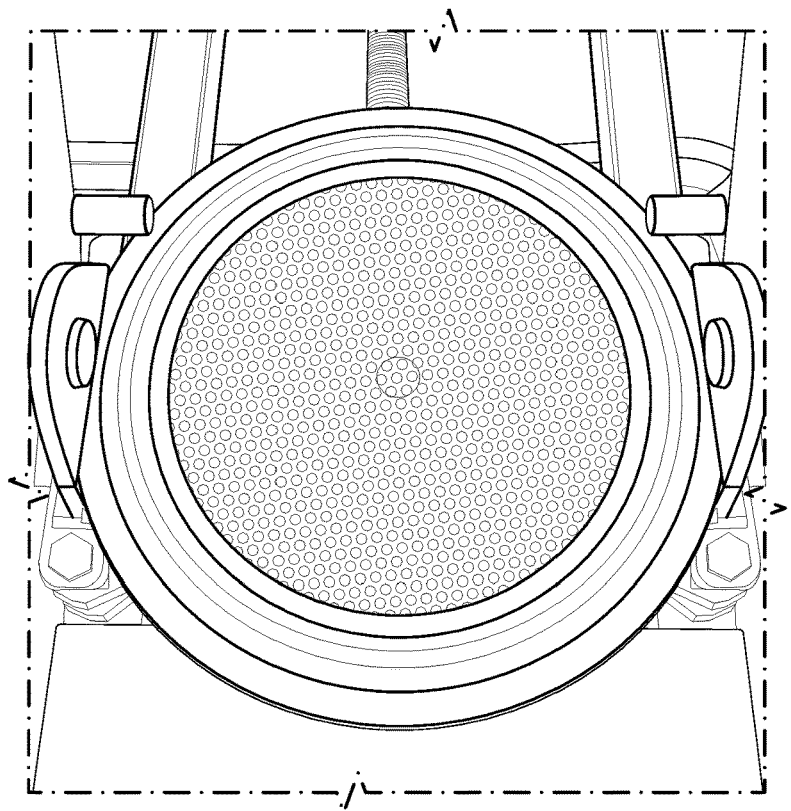
FIG. 19A shows a view of the bottom section of a filtration unit used in one embodiment of the present invention.
Figure 19B:
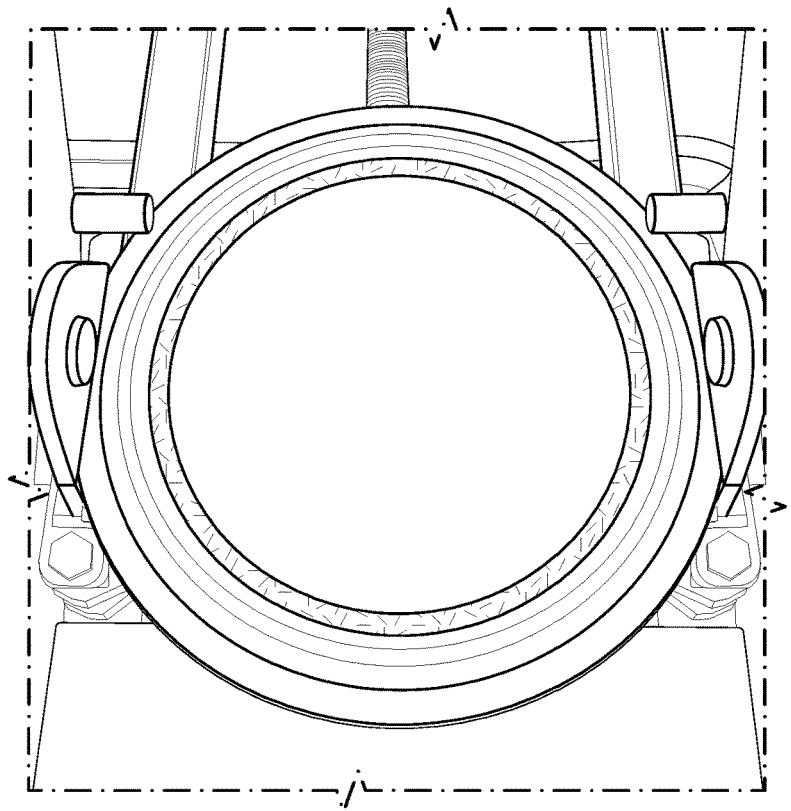
FIG. 19B is a view showing the bottom section shown in FIG. 19A having a sintered titanium disc sealed into separator vessel.
Figure 19C:
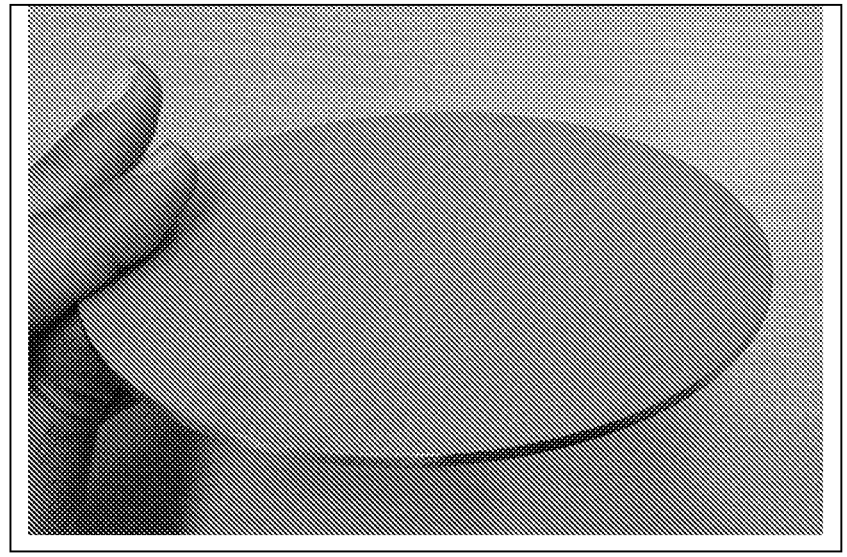
FIG. 19C is a photograph showing a very thin hydrate a layer of thickness under 500 microns formed on the sintered titanium disc.
Figure 19D:
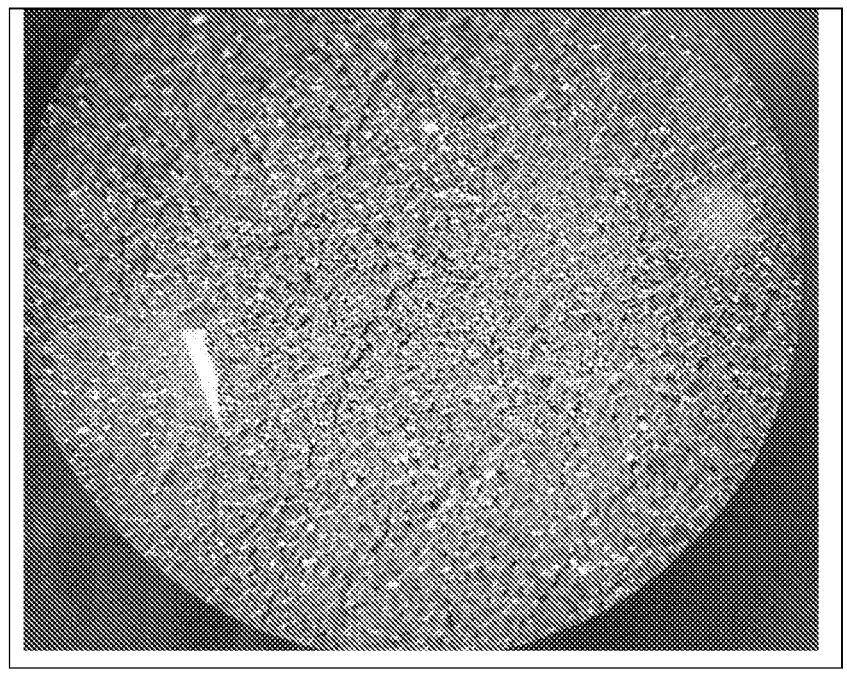
FIG. 19D is a photograph showing the pores of the sintered titanium disc under a microscope (magnification ×100)

The bottom section of an Amdel pressure filter unit that was used for previous pressure filtration tests is shown in FIG. 19A. This section is upgraded using a flat sintered titanium filter disk. Low dosages of hydrate mixed in water was used to make a very dilute hydrate solution. A very flat and smooth porous filter media can be put under the hydrate layer. For example, we used a sintered titanium disk (pore size under 2 micron), under the hydrate layer and it is sealed using waterproof sealing glue (other sealing equipment such as rubber can also be used) (FIG. 19B). The sintered titanium fixed on the bottom of pressure filteration equipment allows the water pass while hydrate builds a thin layer on top. Other similar sintered filter media or fine filter media such as porous plastics, or fine fabrics, membranes or filter paper can also be used. This sintered titanium is very hard and resistant to high pressure. It also has a very smooth shape that allows a very thin (of the order of less than 500 microns, or less than tens of microns, or even less than 10 microns) and consistent layer of hydrate to build up above it (FIG. 19C). It is also acid and alkali resistant. Therefore, it is possible to easily acid wash it at end of filtration to avoid accumulation of any deposits inside the filter. The sintered titanium filter pores under a microscope (100 times magnified) is shown in FIG. 19D.

Figure 19E:
FIG. 19E is a photograph showing the retentate obtained by filtering carrot juice through the separator shown in FIGS. 19A to 19D with a hydrate layer of thickness of under 500 microns.
Figure 25:
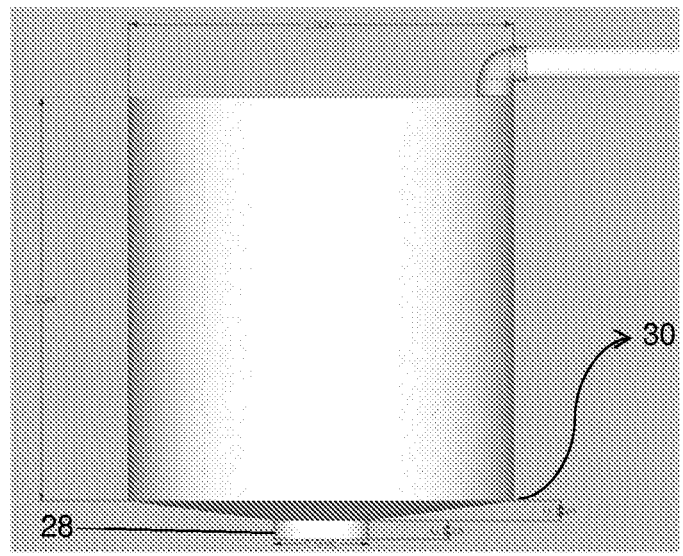
FIG. 25 shows a side view of a filter unit in accordance with any embodiment of the present invention.

The dilute hydrate solution was added on top of the hydrate retaining filter media and allowed to be settled. If the solution is very dilute the hydrate may not settle naturally. Therefore, we applied low pressures (10-40 psig) for several minutes after pouring the dilute hydrate solution. This step causes all hydrates in solution settle and make a very thin consistent hydrate layer film on retaining filter media. The flow rate of hydrate filtration with very thin hydrate layer is very high. and the results of carrot juice filtration without applying any pressure is shown in FIG. 19E. This shows that even the very thin hydrate layer can successfully be used for filtration. Advantageously, filtration rates are very high using the very thin hydrate layer.

Tests conducted by the present inventors have shown that filtration flux rates are significantly higher using separators in accordance with embodiments of the present invention when compared to knowing prior art separation technologies. For example, known separation technologies include microfilters, filters, nanofilters and reverse osmosis technology. Standard average ultrafilters show a filtration flux of 30 LMH (litres/m$^2$/hr), standard nanofilters (for example, having a pore size under 2 nm and operating pressure of 220 to 510 psi) show a filtration flux of around 20 LMH, reverse osmosis membranes have an average filtration flux of around 15 LMH at 250 psi and standard membrane bioreactors show a flux of 10 to 20 LMH. In comparison, fluxes obtained using embodiments of the present invention are shown in Are 1 below:

TABLE 1

| Hydrate membrane flux tests performed | Average measured flux (L/m$^2 \cdot$ h) or LMH | Standard membrane fluxes range (LMH) | Times that hydrate membrane is faster than conventional membranes |
|---|---|---|---|
| demineralised water filtration (hydrate thickness 1 mm, 10-80 psig) | 1672.3 | 10-30 | 167.2-55.7 |
| demineralised water filtration (hydrate thickness 1 mm, no pressure, just gravity) | 647.6 | 10-30 | 64.8-21.6 |
| turbid Brisbane river water filtration (hydrate thickness 1 mm, 40 psig) | 337.3 | 10-30 | 33.7-11.2 |
| turbid Brisbane river water filtration (hydrate thickness 10 mm, 40 psig) | 67.7 | 10-30 | 6.8-2.3 |
| Coffee concentration (hydrate thickness 10 mm, 40 psig) | 95.2 | 10-30 | 9.5-3.2 |
| watermelon juice filtration (hydrate thickness 1 mm, 40 psig) | 91.9 | 10-30 | 9.2-3 |

The data presented in Table 1 shows that the hydrate filter works remarkably faster than conventional high-pressure membranes (such as ultrafilters, nanofilters, reverse osmosis membranes and membrane bioreactors). In some cases, even a hydrate filter at very low or zero applied pressure works significantly faster than conventional high-pressure membranes. Without wishing to be bound by theory, it is postulated that this is due to the fact that the hydrate layer is mostly made up of water.

Use—Drinking Water Survival Kits

A simple water treatment system is needed for emergencies. Diarrhoea has been found to be one of the most common illness affecting long-distance hikers in the United States. Current survival kits in the market, such as water purification tablets, activated carbon filters, and microfilters, are more expensive and less effective than hydrate filtration technology. For example, chlorine tablets that kill pathogens do not remove suspended solids and water is not safe for long-term consumption. Their active ingredients are chlorine and chlorine dioxide, which have health hazards. The water is not immediately ready for drinking. The treated water should sit uncovered for several hours so that the chlorine can evaporate. The chlorine tablet-treated water is still turbid after treatment. The chlorine tablets also leave an unpleasant taste behind. In contrast, the filtrate of aluminium hydroxide hydrate filtration is not only free of microorganisms (including pathogens) but also crystal clear and pleasant to drink. After initial rinsing to remove excess salts from the hydrate gel manufacturing, the filtrate of hydrate filtration is also readily available for drinking. Furthermore some pathogens are chlorine resistant, while a hydrate filter can remove bacteria, fungi, microalgae (including blue green algae) and viruses. The activated carbon filters need more space than the small amount of gel therefore they are not practical to be carried by hikers or army personnel at all times. Microfilters are too complicated and have several parts, and are also hard to carry. Furthermore, current survival kits are more expensive compared to hydrate filters.

Unlike other products in the market, hydrate filter survival kits capture all suspended solids and microbes and the treated water is as clear as distilled water to drink. It has a very simple production and packaging process. Therefore, production factories can be easily implemented with the lowest possible capital and operating costs, with simple equipment. For example, a toothpaste tube of gel which can be easily carried by anyone can save lives in emergency situations. It can be easily supplied by helicopter and other means during disaster times such as flood. The hydrate filter can capture harmful bacteria and viruses and can prevent dangerous diseases such as diarrhoea among hikers and armed forces. Alternatively, the hydrate gel can be produced at the required location using aluminium sulphate and sodium bicarbonate as shown in formula (1).

A variety of different survival kits can be made based on this technology. One simple toothpaste tube packaging of the gel can be put in any survival kit, and be used several times. Another simple packaging of hydrate gel can involve putting the gel on any available fabric during an emergency. For example, the bottom of a sleeve can be tied to make a mini bag, the hydrate gel can be added and then the dirty water can be filtered.

Converting a Water Bottle to a Hydrate Gel Water Purification Device

A very simple survival kit can be made just by modifications of normal plastic water bottles. The only modifications needed are cutting the normal bottle of water in two pieces and putting one internal thread on bottom section (see FIG. 20, reference numeral 21) and two external threads on the top section (FIG. 20, reference numerals 22 and 23). For normal applications, the bottle is the same as a normal plastic water bottle. This is shown in FIG. 21. However, in case of an emergency, the top section of the bottle can be opened by twisting and then reversed and connected upside down to the bottom section as shown in FIG. 22. The lid is equipped with a fabric like filter medium (see FIG. 23, reference numeral 24) that will retain the gel. The gel will be poured inside and after adding dirty water, the filtrate that is clean water will be collected in the bottom section. After the bottom section is filed, a glass of safe filtrate water without any turbidity and pathogens is ready for drinking. This cycle can be repeated several times.

It is also possible to pre-fill the lid with the gel and put a sticker like inside to keep the gel in the lid and to avoid gel drying (FIG. 24, reference numeral 25). The gel can be sealed using different materials such as bottle sealing wax or agarose gel or another plastic lid inside that can be placed during the bottle manufacturing process. During emergencies the sticker on the lid can be removed and filtration can take place. It is also possible to just sell the lid that is prefilled with gel for fitting to standard plastic bottles. In case of emergency, the user will just simply change the lid, and then cut the bottle to collect the filtrate or collect the filtrate in another bottle or cup. The lid which is filled with hydrate gel can also be put on top of squeezable water bottles.

Plastic water bottles are a serious environmental problem in the world. So many fossil fuels are wasted during their production and transportation. They mostly end up in landfills and take up to 1000 years to break down. This technology may also indirectly help the environment. It helps people reusing their bottle of water. People and hikers may not throw away their bottle of water because it is also their valuable survival kit, and may save their life in emergencies.

This simple modification to standard plastic bottles is practical at very low cost, converts problematic plastic bottle of water to a useful survival kit. It can also be sold as more useful replacement of standard plastic bottles of water in chain markets all around the world. Furthermore, tap water quality is very low for safe drinking in so many cities and rural regions around the world, especially in developing countries. Therefore, people buy conventional plastic bottles of water every day. By introducing these new bottles of water, many people can have small, cheap and simple drinking water treatment equipment at home. They can filter tap water several times and save money.

Use—New Hydrate Gel Lab Filters

Most of the current laboratory filters in the market are in the micron size range. There is no current lab filter that can remove all bacteria and fungi and break oil-water emulsions and separate dissolved pigments and nano-sized particles from different solutions. Low pore size filters are expensive and therefore are not practical to operate regularly in daily laboratory work. Current lab filters in the market are filter papers, capsules, cartridges, and Mixed Cellulose Esters (MCE) membranes. They cannot capture bacteria and viruses and break oil in water emulsions similar to hydrate filters. Hydrate filters can achieve all these outcomes. Hydrate lab filters are also very low cost compared to currently available nano-filter products for labs.

In order to form a hydrate gel lab filter, a thick gel can be injected between two glued filter papers (or other similar low pore size media and fabrics) and can be used several times. It can be sealed in a package suited to prevent water loss and drying of the hydrate lab filter. Using these types of packaging the lab filter can be stored for several years. It is also possible to sell tubes of different types of thick gel as filter paper precoats. 200 mL of turbid Brisbane river water were purified using this type of lab filter. The results are similar to other tests and the filtrate was clear water. The suspended solids and bacteria were captured on top of the filter which can be collected. It is possible to reuse this filter several times by just simple washing. After washing, all contaminants captured on the filter paper were removed and the filter paper recovered similarly to a brand new one. This hydrate lab filter was reused several times without any problem. It is also possible to inject different types of hydrate gels for different application and tests.

Use—Small Filters Such as Swimming Pool Filters

Hydrate filtration technology has also the potential, to be used for small-scale-applications such as swimming pools, and be used as a new disinfection and sanitation method. Proper sanitation is needed to maintain the visual clarity of pool water and to prevent the transmission of infectious diseases. Currently, filtration is used to remove pollutants such as dirt and debris and chlorine is used to kill infectious organisms. Conventional sand or diatomaceous earth filters are normally used as swimming pool filters. Conventional filtration processes are not sufficient to completely sanitize the pool's water; therefore, chlorine and bromine are used as sanitisers for swimming pools. Water is forced through a filter and then returned to the pool. A pressure-fed sand filter will generally filter turbid waters of particulates not less than 10 microns, while hydrate filter can separate nanometre particles. Sand filters will normally not remove algae or viruses from the pool water.

Chlorine-generating compounds used for disinfection are toxic. Disinfection chemicals such as chlorine and other materials present in the water may generate disinfection by-products (DBPs). DBPs result from reactions between organic and inorganic matter in water with chemical treatment agents during the water disinfection process. DBPs are associated with negative effects on human health. Chloramine produces N-nitrosodimethylamine (NDMA), which is a possible human carcinogen, as well as highly genotoxic iodinated DBPs, such as iodoacetic acid, when iodide is present in source waters. Residual chlorine (and other disinfectants) may also react further within the distribution network, both by further reactions with dissolved natural organic matter and with biofilms present in the pipes. Furthermore some pathogens are chlorine resistant, while hydrate filters can remove all bacteria, microalgae (including blue-green algae) and fungi and viruses.

Unlike conventional sand filters, a swimming pool separation system based on hydrate separation technology captures all suspended solids and the filtrate is clear water. In a single stage, all suspended solids and bacteria and fungi are captured so there is no need for further problematic disinfection processes. Using hydrate filtration technology, there is no need for using toxic chlorine disinfection, so no toxic chlorine disinfection by-products (DBPs) are generated using this technology. The swimming pool market is large, for example, 11.7% of Australian homes have swimming pools. Moreover, because the very high quality of the filtrate product, compared to other filters in the market, this technology specifically can be used for public swimming pools or those of luxury houses, five star hotels and resorts.

Figure 26:
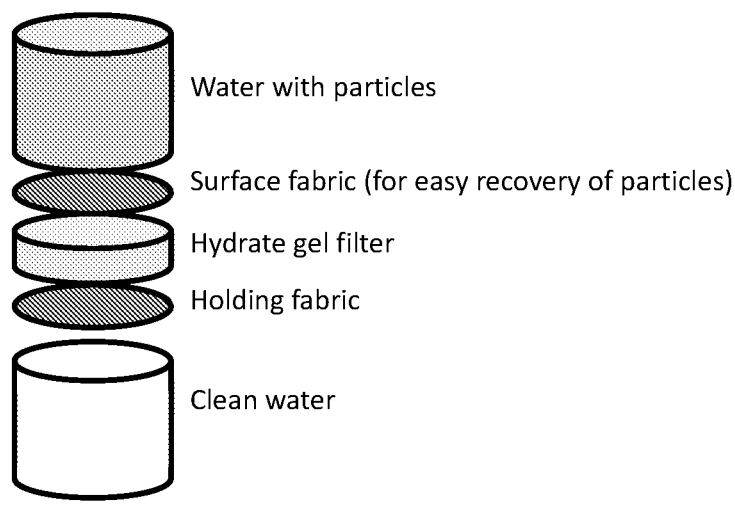
FIG. 26 shows a basic design of a hydrate-based separator in accordance with an embodiment of the present invention.

The hydrate gel can be used in a variety of conventional filtration systems and different shapes such as rotary drum filters, vacuum filters and conveyor filters. However, it is also possible to simply scale-up the small-scale filtration test equipment used in previous examples detailed above. A strong structure is needed to support the bottom fabric, such as holed galvanised metal sheet or metal mesh. To avoid gel destruction it is possible to fine-spray the liquid into the tank until the water depth is high enough to enable rapid filling of the tank. It is also possible to put a fabric or similar hard porous metal or plastic on top of the hydrate gel, or put some baffles under the feed pipe. Another design is shown in FIG. 26 in which a smaller diameter region 28 houses the hydrate gel. Water is fed onto sloping floor 30 and runs down off sloping floor 30 onto the hydrate gel in the section 28. Thus, this design may not need fine spraying or other measures to prevent gel destruction, because water pours on the sloped metal section. To increase the flow rate of this design for some specific applications, it is also possible to place a vacuum chamber underneath the tank or to introduce compressed air to the top of the tank through a pipe similar to those used in conventional compressors. This simple system can be manufactured at very low cost by simple modification to conventional water tanks. It works without any energy and electricity input if the water is fed and removed by gravity. This system may be able to provide for drinking water treatment for a village or a remote mining site or remote army base. It can also be easily installed on a truck as a simple mobile drinking water treatment facility. A swimming pool filtration and sanitation similar to FIG. 26, is not only very low cost and its maintenance is simple and consumes less electricity, but also does not need problematic chlorine disinfection and therefore is safer for use.

Alternative Designs

Figure 27:
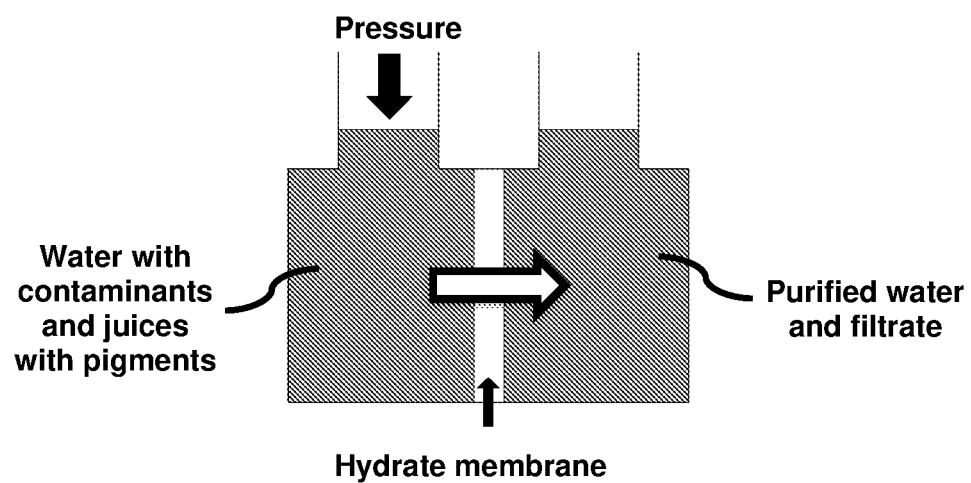
FIG. 27 shows a schematic view of an alternative separator design in accordance with an embodiment of the present invention.
Figure 28:
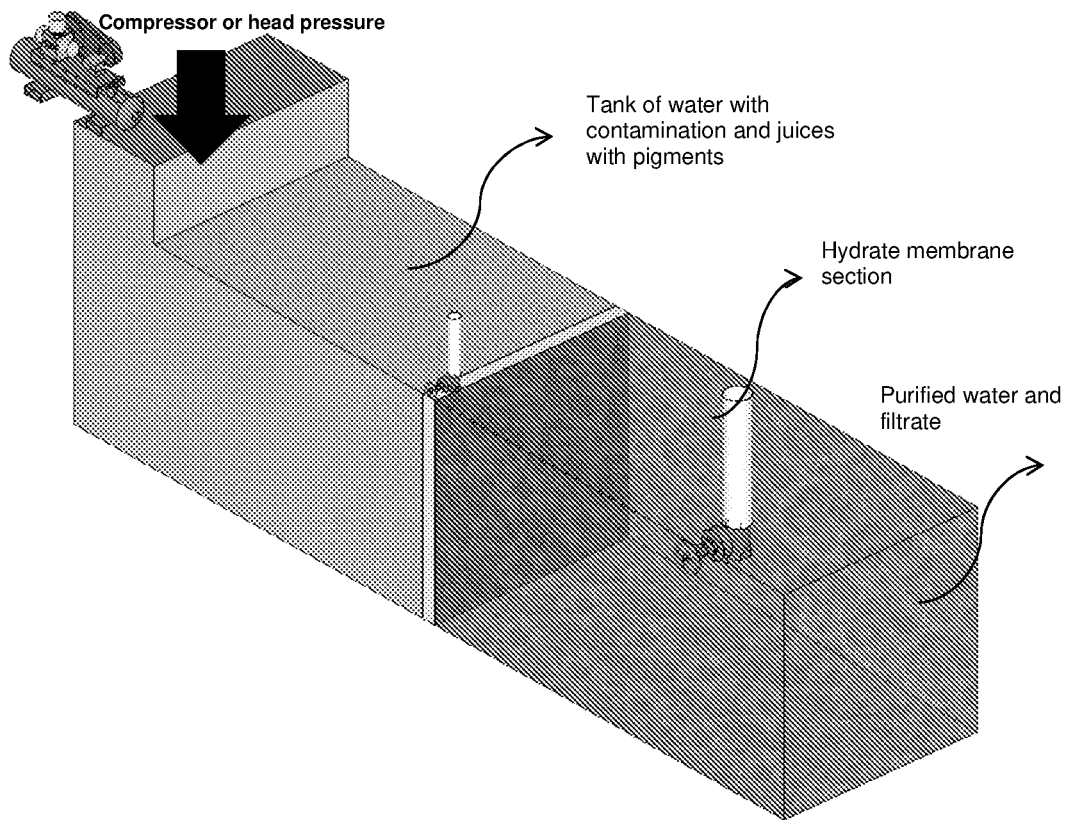
FIG. 28 shows a schematic view of another separator design in accordance with an embodiment of the present invention.

Hydrate membrane separators can be designed in variety of shapes and systems. It can also be designed similar to conventional reverse osmosis membranes (FIG. 27). In this design water molecules are on both sides of the hydrate layer, and all sections of the hydrate layer will be soaked completely in water any time during the filtration process. Therefore, the ratio of the number of water molecules to metal hydroxide molecules will be consistent in each section of the hydrate. This can be an advantage in some applications. One possible larger scale, conceptual design of this system is shown in FIG. 27. A compressor or other similar pressure equipment applies pressure in one side of the filter. In FIG. 27, water molecules and hydrophilic compounds travel to the right side of the hydrate membrane, while contaminants (of water) or hydrophobic compounds and pigments (of juices) accumulate and concentrate on the left side of the hydrate membrane. As the hydrate filter works relatively fast compared to conventional membranes at very low pressure, even a head pressure is most likely to be enough to ensure adequate filtration rate in this design, although it is also apparent that pressure can also be applied to increase the filtration rate. Another similar design is shown in FIG. 28.

Figure 29:
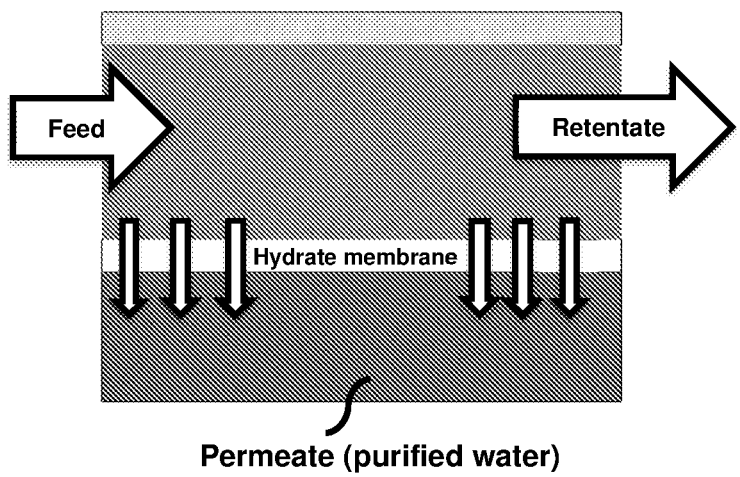
FIG. 29 shows a schematic view of another separator design in accordance with an embodiment of the present invention.

Another design of a hydrate filter unit can be cross flow (tangential). In this design the feed flow travels tangentially across the surface of the hydrate filter, rather than into the filter (FIG. 29). The main advantage of this design is that unlike the batch like dead end filter, the filter cake is washed away, allowing the process to be continuous rather than batch. Using this design less blinding occurs compared to dead-end design. A pump can recycle and recirculate the feed several times around the unit until the desired concentration achieved and the concentrated retentate is transferred out of the unit.

Other Uses

There are thousands of chemical, petrochemical plants and oil refineries around the world which can use this separation technology. Thousands of small and medium sized plants can also use this technology due to its low capital and operating costs.

The technology can also be used in industrial microbiology processes and pharmaceutical processes, especially to address highly expensive dewatering and separation requirements to isolate the desired products.

The technology can also be used to treat mine effluents and in wastewater treatment. Furthermore, some precious components such as gold may be lost as suspended solids in mine effluents. It is also possible to recover precious suspended solid materials such as small gold particles or coal dust from mine effluents.

Comparative Examples

Other Types of Gels Such as Agarose Gel

Agarose gel (2%) is made by mixing 2 g of agar in 100 mL of distilled water and heating for one minute in a microwave. In heated liquid state it passes through the geotextile fabric that has been used to retain the hydroxide hydrate layers of the earlier examples given in this specification. The filtration equipment was then soaked and the agarose gel allowed to solidify by cooling. Brisbane river water was added on top of the gels. While the aluminium hydroxide hydrate gel filters the water fast, not even a drop of water passed the agarose gel. Even after several days no drop of water passed the agarose gel.

This experiment shows that the aluminium hydroxide hydrate gel is different to conventional gels like agarose gel. That is why it was termed hydrate not gel by this invention. Although its appearance is similar to conventional gels, its texture when touched feels similar to light watery creams. Water molecules are loose and can easily leave the hydrate. Conventional gels are solid at low temperatures and water molecules are strongly bonded to agarose and cannot leave the gel. If conventional gels like agarose gels are heated, they will convert to the liquid and therefore cannot be used as precoat. However, the hydrate gel structure does not change by heating. If aluminium hydroxide hydrate is heated its appearance and physical and chemical properties will not change, and it still can be used as filtration precoat. That is why the term aluminium hydroxide hydrate is more appropriate than aluminium hydroxide gel.

Example

Basic Design of Hydrate Gel Separator

FIG. 22 shows a basic design of a hydrate gel separator in accordance with an embodiment of the present invention. The components shown in FIG. 22 that are positioned above the clean water will normally be located within a housing. The housing will normally have side walls that retain the holding fabric, the hydrate gel filter, the surface fabric and the mixture of water with particles. The housing will typically have a porous or permeable bottom located directly below the holding fabric.

The separator comprises a holding fabric, which may be a geotextile fabric or any other fabric that has pore size that is sufficiently small to retain the hydrate gel. The hydrate gel layer is held on top of the holding fabric and is retained by the holding fabric. An optional surface fabric may be positioned on top of the hydrate gel layer if it is desired to recover particles or other components separated from the mixture. The mixture of water and particles (or other components, such as microorganisms or non-polar molecules or hydrophobic molecules) is positioned above the hydrate gel layer. Water, dissolved salts and polar liquids can pass through the hydrate gel layer and as a result, these components are separated from the other components that cannot pass through the hydrate gel layer. The components that pass through the hydrate gel layer can be collected in the "clean water" below the hydrate gel layer. The components that cannot pass through the hydrate gel layer accumulate on the top of the surface fabric (when the surface fabric is present) or, in the absence of the surface fabric, on top of the hydrate gel layer.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A separator for separating one or more components selected from particulate material, hydrophobic material, non-polar material, microorganisms, or viruses from a mixture of water and the one or more components or from a mixture of a polar liquid and the one or more components, wherein the separator comprises a vessel, a single downstream porous retainer extending across the vessel, and a single continuous layer consisting of a metal hydroxide hydrate gel extending fully across the single downstream porous retainer to ensure that all filtrate has passed through the single continuous layer of metal hydroxide hydrate gel, the single continuous layer of the metal hydroxide hydrate gel being positioned upstream of the single downstream porous retainer, the single continuous layer of the metal hydroxide hydrate gel retaining the one or more components on the single continuous layer of the metal hydroxide hydrate gel whilst the water or the polar liquid passes through the single continuous layer of the metal hydroxide hydrate gel to thereby separate the one or more components from the water or the polar liquid, wherein the metal hydroxide hydrate gel is selected from a gel comprising one or more of aluminium hydroxide hydrate, magnesium hydroxide hydrate, zinc hydroxide hydrate, manganese hydroxide hydrate, cobalt hydroxide hydrate and nickel hydroxide hydrate, wherein the separator further comprises a single upstream retainer placed upstream from the single continuous layer of the metal hydroxide hydrate gel.

2. A separator as claimed in claim 1 wherein the single upstream retainer comprises a fabric, a woven material, a foraminous material, a solid material having one or more holes or pores therein, a porous ceramic material, or a mesh material.

3. A separator as claimed in claim 1 wherein the single continuous layer of the metal hydroxide hydrate gel has a thickness of from 1 micron to 1 meter.

4. A separator as claimed in claim 1 wherein the metal hydroxide hydrate gel has at least 10 molecules of water associated with each molecule of metal hydroxide.

5. A method comprising a separator as claimed in claim 1, wherein the method comprises supplying the mixture to the separator and causing the water or the polar liquid from the mixture to pass through the single continuous layer of the metal hydroxide hydrate gel, wherein all filtrate passes through the single continuous layer of the metal hydroxide hydrate gel and wherein the one or more components cannot pass through the single continuous layer of the metal hydroxide hydrate gel and the one or more components are retained on the single continuous layer of the metal hydroxide hydrate gel whilst the water or polar liquid passes through the single continuous layer of the metal hydroxide hydrate gel.

6. A method as claimed in claim 5 wherein pressure is applied to the mixture.

7. A method as claimed in claim 5 wherein the metal hydroxide hydrate gel is prepared by generating a metal hydroxide in water or in an aqueous solution to thereby form the metal hydroxide hydrate gel or wherein the metal hydroxide hydrate gel is prepared by mixing two or more reactants together to thereby form the metal hydroxide hydrate gel or the metal hydroxide hydrate gel is formed by electrolysis.

8. A separator as claimed in claim 3 wherein the single continuous layer of the metal hydroxide hydrate gel has a thickness of from 1 micron to 50 cm.

9. A separator as claimed in claim 3 wherein the single continuous layer of the metal hydroxide hydrate gel has a thickness of from 1 micron to 10 cm.

10. A separator as claimed in claim 3 wherein the single continuous layer of the metal hydroxide hydrate gel has a thickness of from 1 micron to 10 mm.

11. A separator as claimed in claim 4 wherein the metal hydroxide hydrate gel has from 30 to 400 molecules of water associated with each molecule of metal hydroxide.

12. A separator as claimed in claim 4 wherein the metal hydroxide hydrate gel has from 37 to 300 molecules of water associated with each molecule of metal hydroxide.

13. A separator as claimed in claim 4 wherein the metal hydroxide hydrate gel has from 37 to 90 molecules of water associated with each molecule of metal hydroxide.

14. A separator as claimed in claim 1 wherein the separator comprises an inlet through which the mixture enters the separator and an outlet through which the water or polar liquid that has passed through the single continuous layer of the metal hydroxide hydrate gel exits the separator.

* * * * *